US012000119B2

(12) United States Patent
Underwood

(10) Patent No.: US 12,000,119 B2
(45) Date of Patent: Jun. 4, 2024

(54) SECURING DEVICE AND REMOVAL TOOL FOR USE WITH THE SECURING DEVICE

(71) Applicant: HOT SPOT HOLDINGS PTY LTD, Port Macquarie (AU)

(72) Inventor: Perry John Underwood, Lake Cathie (AU)

(*) Notice: Subject to any disclaimer, the term of this patent is extended or adjusted under 35 U.S.C. 154(b) by 71 days.

(21) Appl. No.: 17/614,962

(22) PCT Filed: Jun. 1, 2020

(86) PCT No.: PCT/AU2020/050556
§ 371 (c)(1),
(2) Date: Nov. 29, 2021

(87) PCT Pub. No.: WO2020/237326
PCT Pub. Date: Dec. 3, 2020

(65) Prior Publication Data
US 2022/0220710 A1    Jul. 14, 2022

(30) Foreign Application Priority Data

May 31, 2019   (AU) ................................ 2019901888
Feb. 14, 2020  (AU) ................................ 2020900429

(51) Int. Cl.
*E02F 9/28* (2006.01)
*H01F 7/02* (2006.01)

(52) U.S. Cl.
CPC .............. *E02F 9/2833* (2013.01); *H01F 7/02* (2013.01)

(58) Field of Classification Search
CPC ........ H01F 7/0242; H01F 7/0263; H01F 7/04; Y10T 24/32
See application file for complete search history.

(56) References Cited

U.S. PATENT DOCUMENTS

| 5,092,019 A * | 3/1992 | Levy ...................... A44C 5/208 24/616 |
| 5,317,789 A * | 6/1994 | Levy ...................... A44C 5/208 24/616 |

(Continued)

FOREIGN PATENT DOCUMENTS

| CA | 2551312 A1 | 12/2007 |
| CN | 210439370 U | 5/2020 |

(Continued)

OTHER PUBLICATIONS

DE-102013203440-B4 translation (Year: 2018).*
(Continued)

*Primary Examiner* — Michael W Hotchkiss
(74) *Attorney, Agent, or Firm* — MORRISS O'BRYANT COMPAGNI CANNON, PLLC

(57) ABSTRACT

There is described a securing device (10) for releasably securing a first object to a second objection. The device comprises a casing (12) and a coupling magnet (22) housed in the casing. The casing is configured for being inserted in a passageway formed by aligned openings (54, 60) of the first and second objects when assembled together, for blocking separation of the first object and the second object from one another. The coupling magnet (22) is moveable from an initial position to a working position to form a magnetic coupling for holding the casing in the passageway. The first and second objects can respectively be a tooth (50) of a mining or excavation bucket and an adaptor (52) of the bucket for the tooth (50). A fixed magnet (28) can be provided in the casing (12), the fixed magnet (28) being oppositely poled with respect to the coupling magnet (22) for damping the movement of the coupling magnet to its working position. There is also provided a removal tool (178) for removal of the securing device from its securing position. The removal tool includes a coupling magnet (180)

(Continued)

for being moved from a retracted position to a coupling position for magnetically coupling with the securing device (10) for releasing the coupling magnet (22) of the securing device from its working position and withdrawal of the securing device.

16 Claims, 20 Drawing Sheets

(56) References Cited

U.S. PATENT DOCUMENTS

| | | | |
|---|---|---|---|
| 5,709,043 A | 1/1998 | Jones et al. | |
| 6,981,391 B2 * | 1/2006 | Suzuki | A44C 5/2076 63/3 |
| 7,658,025 B2 * | 2/2010 | Bentley | E02F 9/2833 37/456 |
| 8,368,494 B2 * | 2/2013 | Fiedler | B62J 11/00 269/8 |
| 8,800,117 B2 * | 8/2014 | Fiedler | A44B 11/258 24/303 |
| 9,324,487 B1 * | 4/2016 | Wei | H01F 7/0221 |
| 9,926,687 B2 * | 3/2018 | Hand | E02F 9/285 |
| 10,347,408 B2 * | 7/2019 | Chaizy | H01F 7/0263 |
| 10,580,557 B2 * | 3/2020 | Chaizy | H01F 7/04 |
| 10,733,917 B2 * | 8/2020 | Davison | G09F 7/18 |
| 11,233,356 B2 * | 1/2022 | Rohrbach | G06F 1/18 |
| 11,274,422 B2 * | 3/2022 | Wood | E02F 9/2883 |
| 11,600,419 B2 * | 3/2023 | Lee | H01F 7/0263 |
| 2008/0000114 A1 * | 1/2008 | Bentley | E02F 9/2833 37/457 |
| 2009/0043324 A1 * | 2/2009 | Paschal | A61B 5/15019 606/181 |
| 2009/0044435 A1 * | 2/2009 | Bentley | E02F 9/2841 37/456 |
| 2010/0171578 A1 * | 7/2010 | Fiedler | H01F 7/04 335/295 |
| 2010/0257759 A1 * | 10/2010 | Ko | E02F 9/2841 37/456 |
| 2010/0283269 A1 * | 11/2010 | Fiedler | A44B 11/258 292/251.5 |
| 2011/0001025 A1 * | 1/2011 | Fiedler | H01F 7/0242 248/206.5 |
| 2011/0073118 A1 * | 3/2011 | Ponsort | A61F 5/3761 128/845 |
| 2013/0097894 A1 * | 4/2013 | Pippins | E02F 9/2841 29/270 |
| 2014/0034080 A1 | 2/2014 | Paquet et al. | |
| 2014/0077910 A1 * | 3/2014 | Chaizy | H01F 7/04 335/295 |
| 2016/0281336 A1 * | 9/2016 | Clendenning | E02F 9/2825 |
| 2017/0301446 A1 * | 10/2017 | Chaizy | H01F 7/0263 |

FOREIGN PATENT DOCUMENTS

| | | | | |
|---|---|---|---|---|
| DE | 102013203440 B4 * | 8/2018 | | E05C 19/163 |
| DE | 102017108674 A1 * | 10/2018 | | |
| WO | 2001043147 A1 | 6/2001 | | |
| WO | 2002103122 A1 | 12/2002 | | |
| WO | 2013059612 A2 | 4/2013 | | |
| WO | 2014153591 A1 | 10/2014 | | |
| WO | 2015054741 A1 | 4/2015 | | |
| WO | 201919724 A1 | 10/2019 | | |

OTHER PUBLICATIONS

DE-102017108674-A1 translation (Year: 2018).*
EPO Supplemental Search Report dated May 25, 2023.
International Search Report—WO 2022/115912, dated Feb. 11, 2022.
Written Opinion—WO 2022/115912, dated Feb. 11, 2022.

* cited by examiner

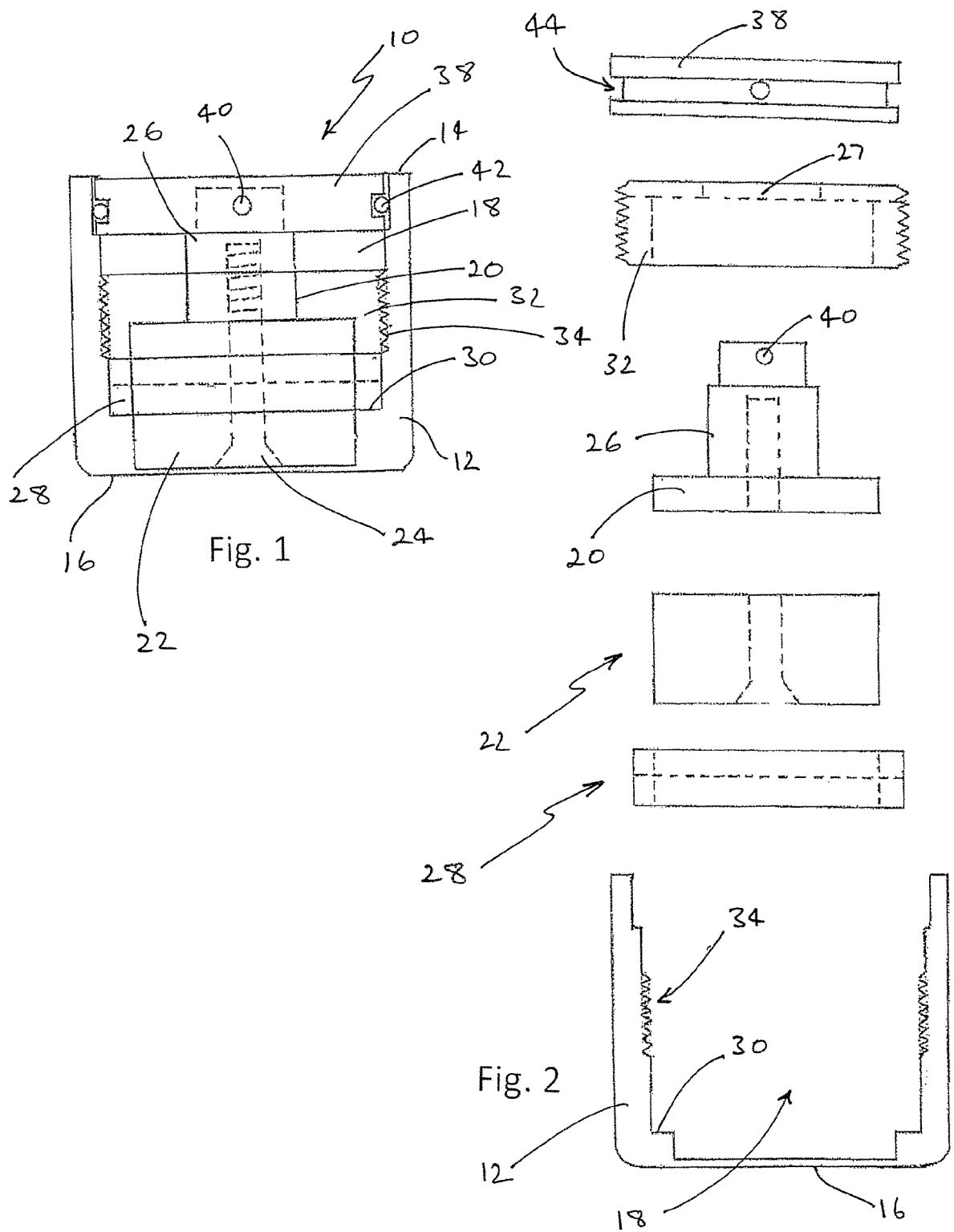

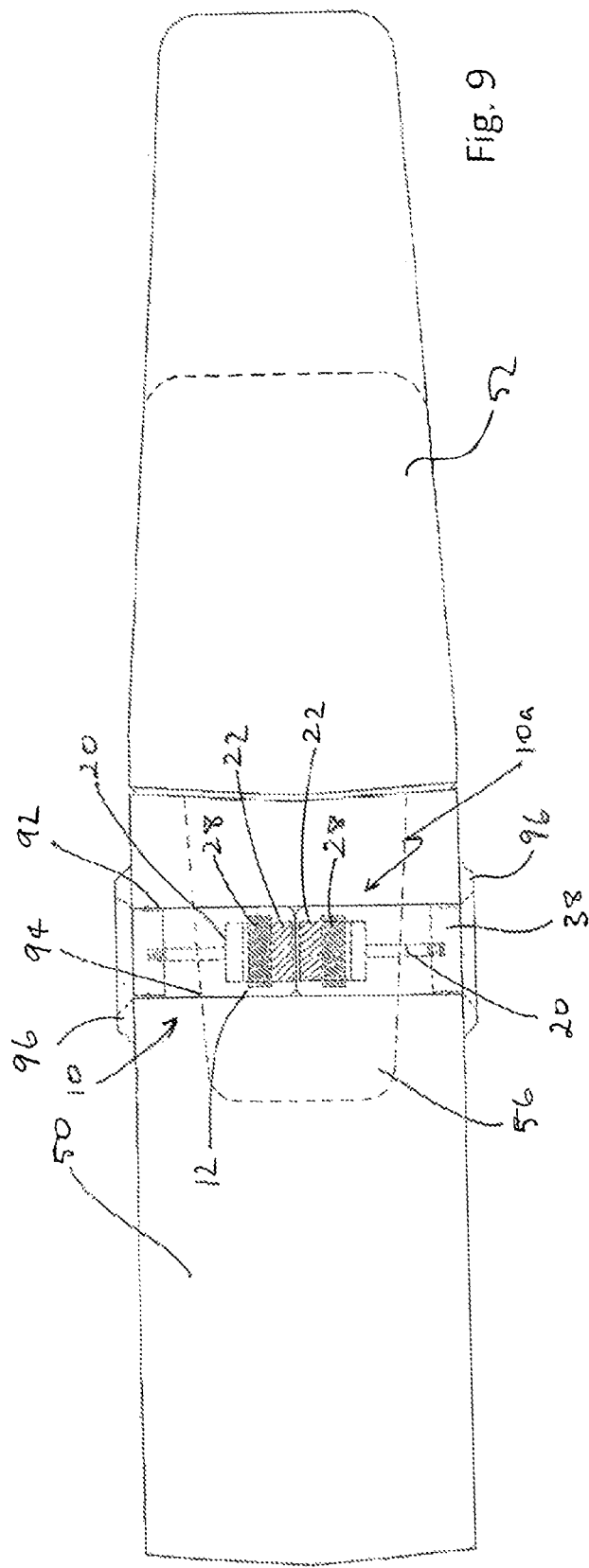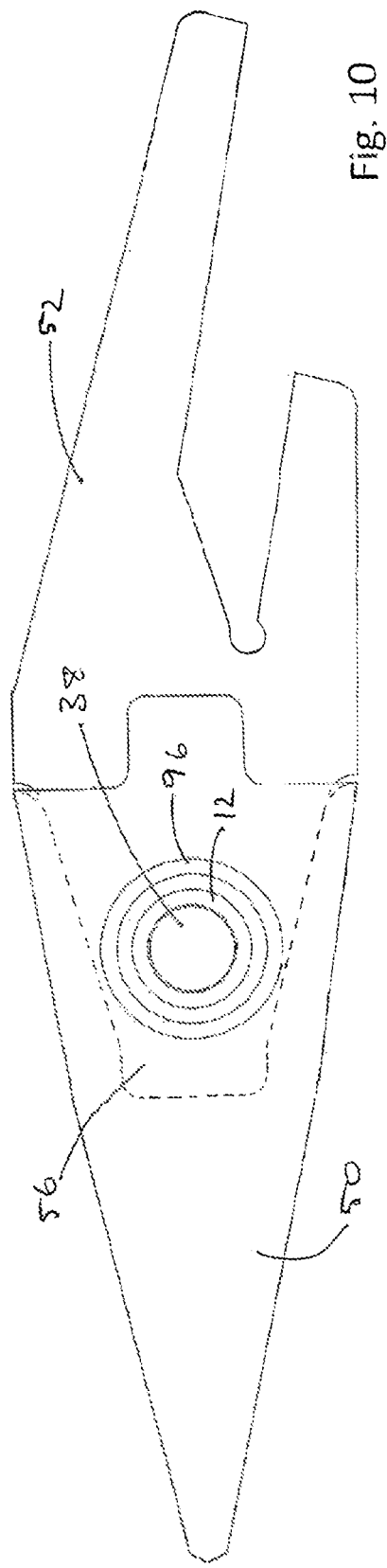

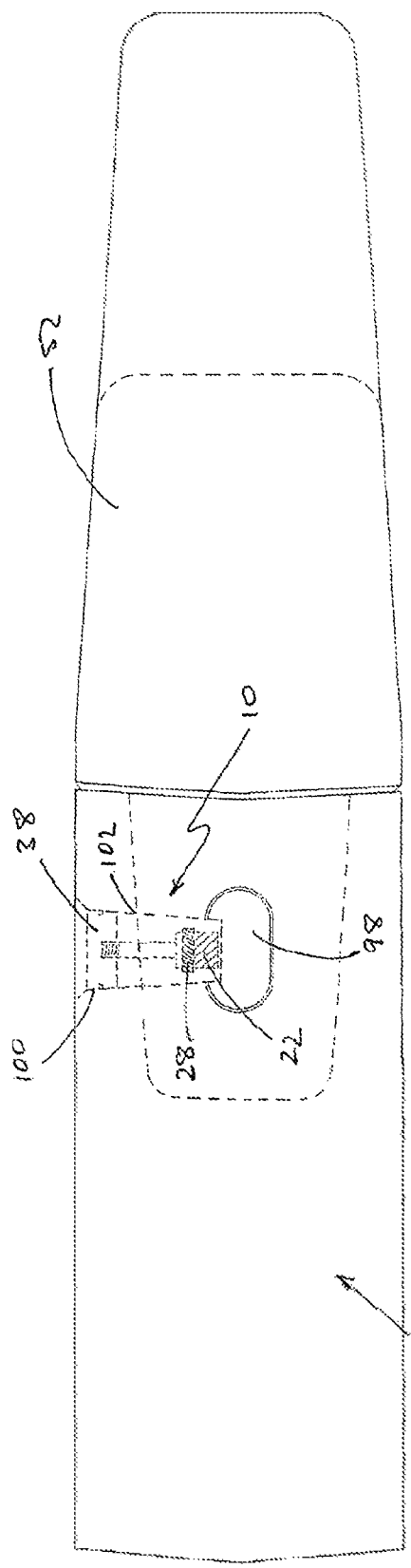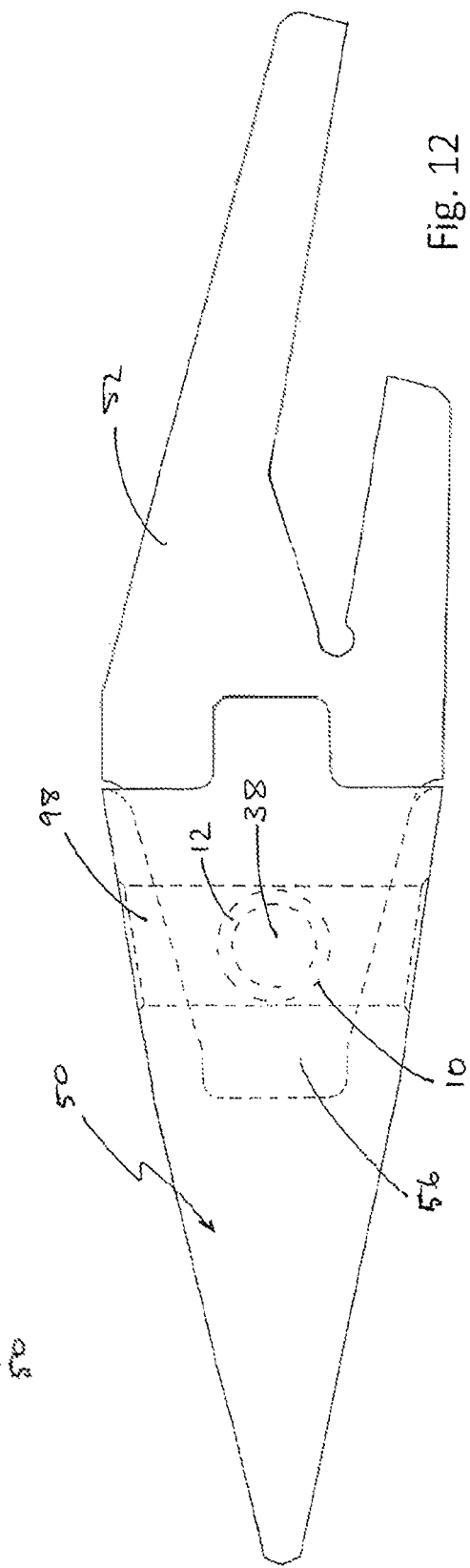

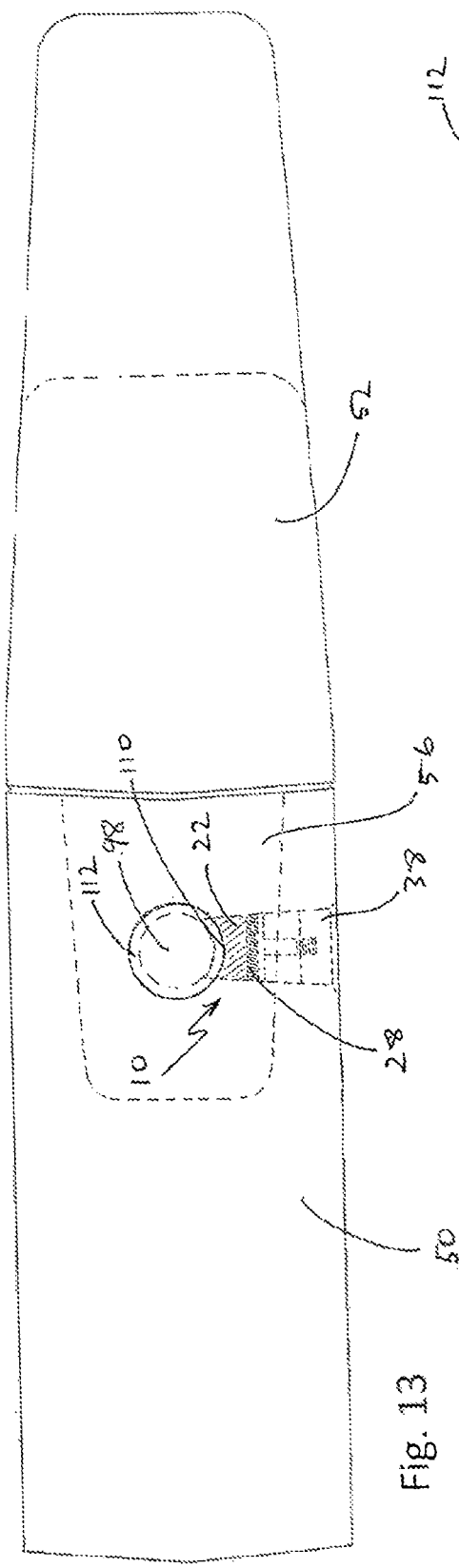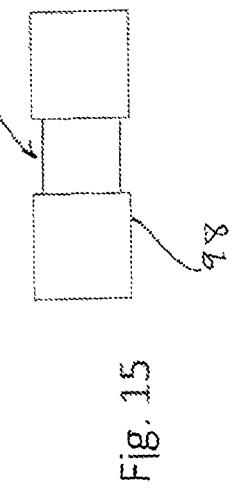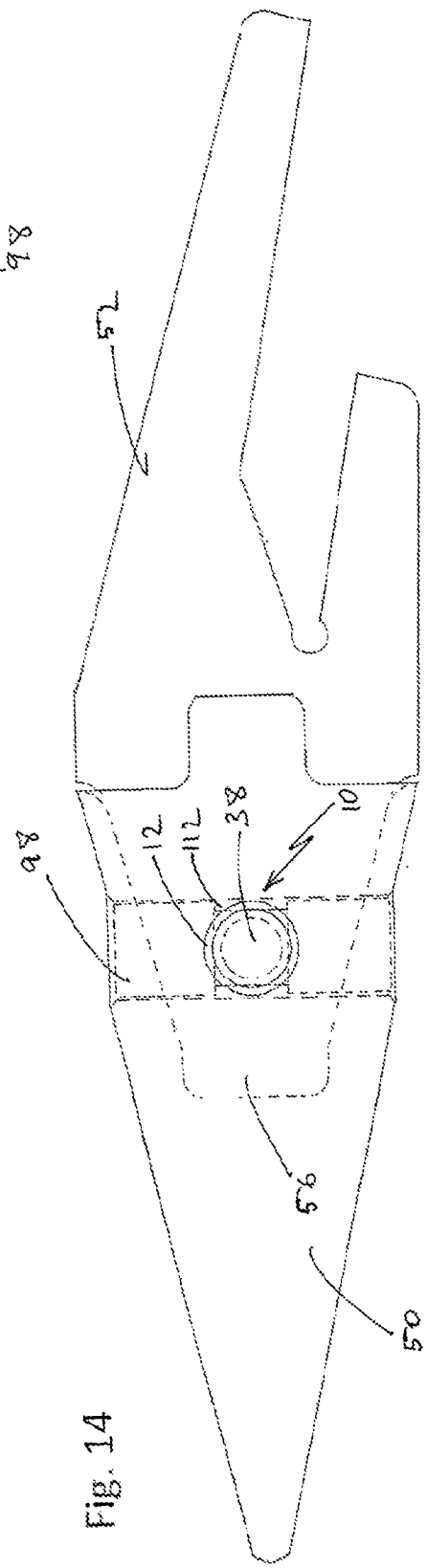

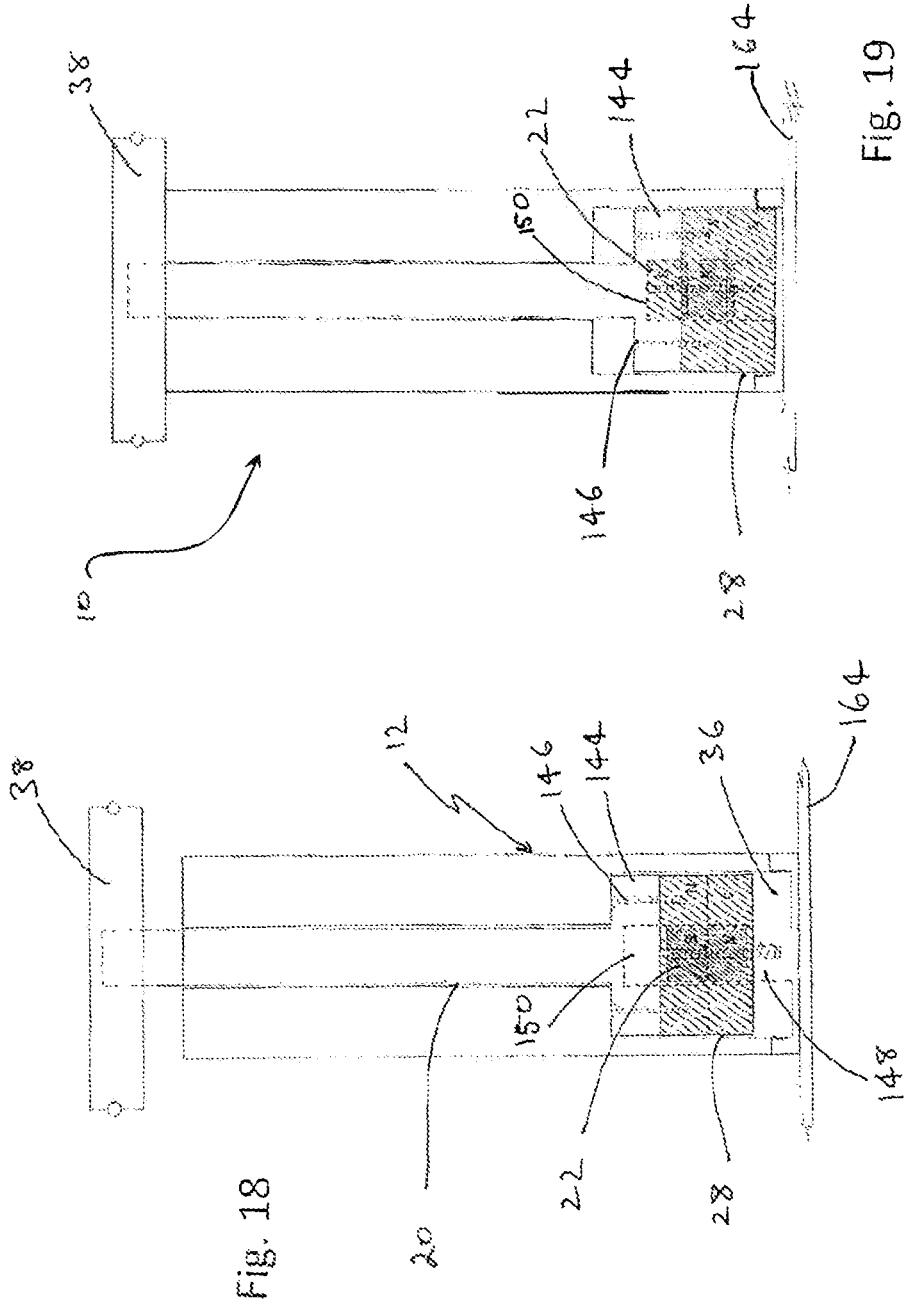

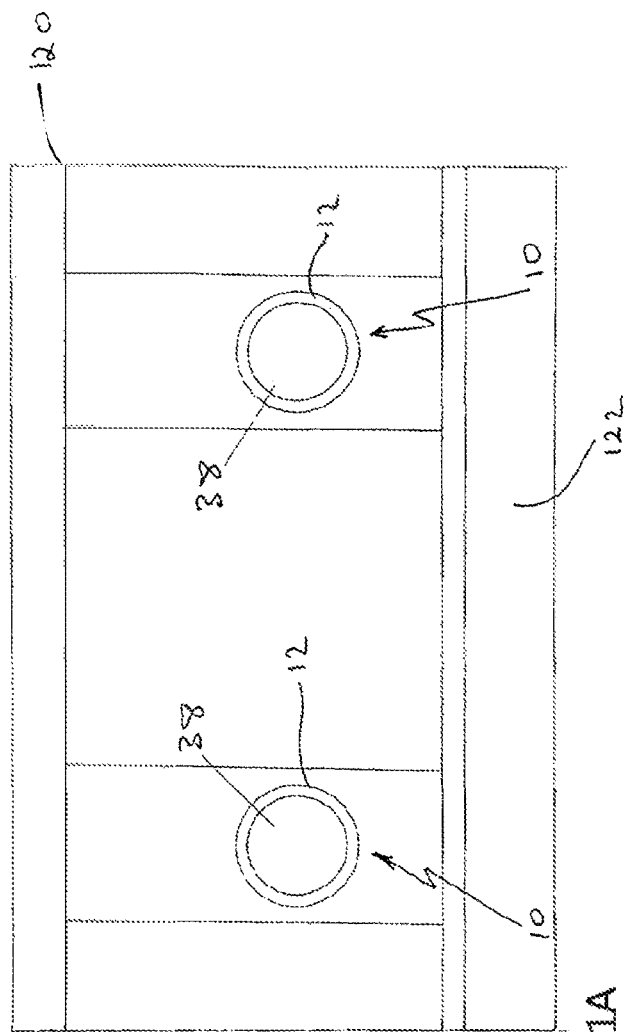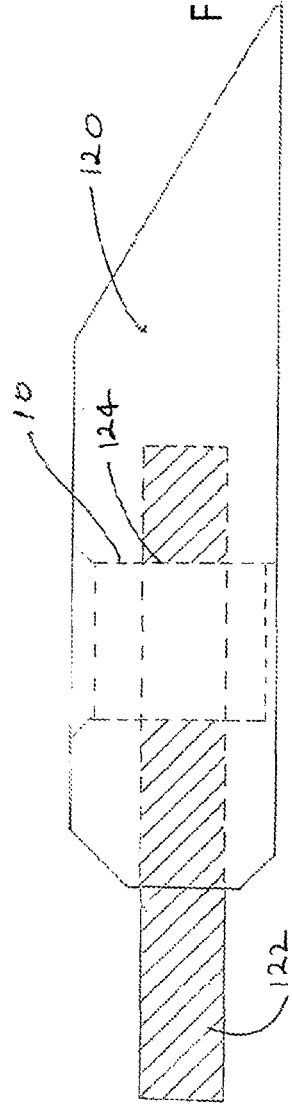

SECURING DEVICE AND REMOVAL TOOL FOR USE WITH THE SECURING DEVICE

CROSS-REFERENCE TO RELATED APPLICATIONS

This application is a U.S. National Stage entry of International Application No. PCT/AU2020/050556 filed Jun. 1, 2020, which claims the benefit of Australian Patent Application No. 2019901888 filed on May 31, 2019 and Australian Patent Application No. 2020900429 filed on Feb. 14, 2020, each of which is herein incorporated by reference in its entirety for all purposes.

FIELD OF THE INVENTION

The present invention relates to a securing device for releasably securing a first object to a second object. The invention also relates to an assembly of the first and second objects secured together by a securing device of the invention, as well as a removal tool for removing a securing device of the invention from its securing position. Methods for use of a securing device and removal tool embodied by the invention are also provided.

BACKGROUND OF THE INVENTION

Various securing devices have been described in the art for releasably securing a tooth to an adaptor of a mining or excavation bucket (e.g., a dragline bucket). Securing devices for securing a wear plate to such buckets or other equipment have also been described. However, conventionally known such securing devices involve the use of mechanical fastener for retention of the securing device in position or holding pins that involve the use of clips or brackets to retain the holding pin in position.

A securing device that involves the use of a mechanical fastener is for instance described in International patent publication No. WO 2015/054741. The use of a mechanical fastener can be problematic as dirt and detritus can become caked around the fastener head in use which can make access for removal of the device difficult. The fastener can also become cemented in position and/or incorrect use of tools can result in the head of the fastener being rounded or otherwise damaged which can also make loosening or removal of the fastener problematic. The need to fit and tighten the fastener is also time consuming. Likewise, the use of clips or brackets to retain a holding pin in position can also be cumbersome.

SUMMARY OF THE INVENTION

In a first aspect of the invention there is provided a securing device for releasably securing a first object to a second object, the device comprising:
 a casing having a top and a bottom; and
 at least one magnet housed in the casing, the casing being configured for being inserted in a passageway formed by aligned openings of the first and second objects when assembled together whereby the casing blocks separation of the first object and the second object from one another, and the magnet is moveable from an initial position to a working position to form a magnetic coupling for holding the casing in position in the passageway.

Typically, the securing device is a unitary assembly in which the magnet is retained captive within the casing and is restricted to movement between the initial and working positions of the magnet.

Typically, the magnet is arranged for return to its initial position upon being withdrawn from the magnetic coupling to allow for removal of the casing from the passageway and thereby separation of the first and second objects.

In another aspect of the invention there is provided an assembly of a first object and a second object releasably secured together by a securing device comprising a casing and at least one magnet housed in the casing, the magnet being moveable between an initial position and a working position, wherein openings of the first object and the second object are aligned forming a passageway in which the casing of the securing device is positioned such that the casing extends from one of the first and second objects into the other of the first and second objects blocking separation of the first object and the second object from one another, the magnet being in its working position forming a magnetic coupling holding the casing of the securing device in position in the passageway.

In another aspect of the invention there is provided a method for releasably securing a first object to a second object, comprising:
 providing a securing device for securing the first object and the second object together, the securing device comprising a casing housing at least one magnet moveable from an initial position to a working position;
 assembling the first and second objects together whereby openings of the first and the second objects are aligned forming a passageway; and
 positioning the casing of the securing device in the passageway such that the casing extends from one of the first and second objects into the other of the first and second objects blocking separation of the first object and the second object from one another, and the magnet is moved from its initial position to its working position to form a magnetic coupling holding the casing of the securing device in position in the passageway.

Typically, the securing device further comprises at least one further magnet, wherein the further magnet is arranged for being in a magnetically repelling relationship with the moveable magnet when the moveable magnet is in its working position. By magnetically repelling the moveable magnet the further magnet in at least some embodiments acts to dampen the movement of the moveable magnet into its working position when forming the magnetic coupling and assists release of the moveable magnet from the magnetic coupling for return of the moveable magnet to its initial position and thereby, the removal of the securing device from the passageway to allow for separation of the first object and the second object from one another.

Typically, in particularly preferred embodiments, one of the moveable and the further magnet is received by the other of those magnets.

Typically, the moveable magnet and the further magnet are oppositely poled to one another in the initial position of the moveable magnet, and wherein the moveable magnet is slidable relative to the further magnet.

In preferred embodiments described herein. the further magnet may be retained in a fixed position within the casing of the securing device.

Typically, the moveable magnet is moved into the magnetically repelling, relationship with the further magnet with travel of the moveable magnet from its initial position to its working position.

Typically, the securing device further comprises a plunger element to which the movable magnet is secured, the plunger element being moved from a resting position to a securing position with the movement of the moveable magnet from its initial position to its working position.

Typically, the securing device further comprises a cap on an outer end of the plunger, the cap being formed from a magnetically attracted material and arranged to move with the plunger to close the casing with the movement of the plunger to its securing position.

In another aspect of the invention there is provided a securing device for releasably securing a first object to a second object, the device, comprising:
- a casing having a top and a bottom and an interior cavity;
- a first magnet disposed in the cavity; and
- a moveable magnet, one of the moveable and the first magnets being received by the other of the magnets, the first magnet and the moveable magnet being oppositely magnetically poled to one another in an initial position of the movable magnet and the movable magnet being slidable relative to the first magnet, and wherein the moveable magnet is arranged for being moved from its initial position into a working position in the casing for releasably securing the first object to the second object.

In at least some embodiments, the moveable magnet is arranged to be drawn into its working position to secure the first and second objects together by magnetic attraction of the moveable magnet when the casing of the securing device is located in position relative to the first object and the second object.

In other embodiments, the moveable magnet is arranged to be driven into its working position by application to the moveable magnet of a manual driving force.

Typically, the securing device further comprises a retaining element retaining the plunger element within the cavity of the casing.

Typically, the first/further magnet is retained in the cavity of the casing between the retaining element and the bottom of the casing. Most typically, the first magnet is retained in a fixed position by the retaining element and generally, the first magnet is seated on an internal ledge defined in the cavity of the casing.

Typically, the cap has an outer perimeter and further comprises a sealing element located about the outer perimeter for sealing the opening of the cavity when the plunger is in the securing position.

In other embodiments, the outer perimeter of the cap can be tapered for being seated on a correspondingly tapered wall of the casing, and a sealing element is located under the cap for sealing the cavity of the casing when the plunger is in its securing position.

Typically, the moveable magnet is secured to the plunger by a fastener.

Typically, the plunger and the casing are formed from a non-magnetic material and so are essentially non-magnetic.

Typically, the casing is profiled for being located within a corresponding through passageway of the first object for releasably securing the first object and the second object together.

In at least some embodiments, the casing has an end for abutment with one of the first and second objects and a protrusion extending from an opposite end for abutment of the protrusion with the other of the first and second objects to inhibit sliding withdrawal of the first and second objects apart from one another in use. The protrusion in at least some forms is a foot for being located in a recess formed by the first and second components when the first and the second components are in an assembled configuration for being secured together.

Typically, opposite ends of the casing are angled away from one another in a top to bottom direction of the casing.

Typically, in at least some embodiments, the casing has opposite side faces between the opposite ends of the casing, that are angled toward one another in the top to bottom direction of the casing.

In other embodiments, the casing can be cylindrical. In such embodiments, the casing can taper in the top to bottom direction of the casing whereby the width of the top of the casing is greater than that of the bottom of the casing, and so be essentially frustoconical in shape.

In at least some embodiments, a retaining element can be used for retaining the first object and the second object in an assembled configuration wherein the moveable magnet is held in a working position by magnetic attraction to the retaining element against sliding return of the moveable magnet to its initial position.

In another aspect of the invention there is provided a securing assembly for releasably securing a first object to a second object, the assembly comprising:
- a casing having a top and a bottom and an interior cavity;
- a first magnet disposed in the cavity;
- a moveable magnet, one of the moveable and the first magnets being received by the other of the magnets, the first magnet and the moveable magnet being oppositely magnetically poled to one another in an initial position of the movable magnet and the movable magnet being slidable relative to the first magnet; and
- a retaining element for retaining the first object and the second object in an assembled configuration, the moveable magnet being held in a working position by magnetic attraction to the retaining element against sliding return of the moveable magnet relative to the first magnet to its initial position.

Typically, in such embodiments, the bottom of the casing is arranged for being seated on the retaining element when the securing device is located in position for securing the first object to the second object.

The retaining element in at least some forms comprises a further magnet for being fitted to the second object to align with the plunger element in an oppositely poled magnetic orientation to the moveable magnet for magnetic attraction of the moveable magnet into its working position. In such embodiments the retaining element can be in the form or a retaining plate comprising the further magnet.

In other embodiments the retaining element can be a holding pin received by the first object and the second object.

In another aspect of the invention there is provided a securing assembly releasably securing a first object to a second object, the securing assembly comprising:
- a casing having a top and a bottom and an interior cavity;
- a first magnet disposed in the cavity; and
- a moveable magnet, one of the moveable and the first magnets being received by the other of the magnets, the first magnet and the moveable magnet being oppositely magnetically poled relative to one another in an initial position of the movable magnet, wherein the moveable magnet is in a working position in the cavity of the casing for magnetically retaining the securing device in position whereby the first and the second objects are releasably secured together, the movable magnet being held in the working position by magnetic coupling of the movable magnet with a magnetically attracted material and/or further magnet against sliding return relative to the first magnet to its initial position.

In another aspect of the invention there is provided a method for releasably securing a first object to a second object, the method comprising:
  providing the securing device, the securing device comprising a casing, the casing having a top and a bottom and an interior cavity; a first magnet disposed in the cavity; and a moveable magnet, one of the moveable and the first magnets being received by the other of the magnets, the first magnet and the moveable magnet being oppositely magnetically poled relative to one another in an initial position of the movable magnet, and the movable magnet being slidable relative to first magnet;
  arranging the first object and the second object together;
  locating the casing of the securing device in position; and
  securing the first and second objects together by movement of the movable magnet from the initial position into a working position in the cavity, the movable magnet being held in the working position by magnetic coupling of the movable magnet with a magnetically attracted material and/or further magnet against sliding return to its initial position, and the magnetic coupling of the movable magnet retaining the securing device in position.

Typically, in embodiments of a securing device as described herein the first magnet and the moveable magnet are each respectively provided as a single magnet.

In other embodiments, the first magnet and/or the moveable magnet may be provided in a number of respective magnet sections that may be spaced apart from one another but which are nevertheless arranged to function together as described herein.

In still another aspect of the present invention there is provide a removal tool for removing a securing device magnetically retained in a position securing first and second objects together by a magnet of the securing device to permit separation of the first and second objects, the removal tool comprising:
  a casing;
  a coupling magnet for magnetically coupling with the securing device by magnetic attraction of the coupling magnet for the securing device to facilitate withdrawal of the magnet of the securing device and thereby the removal of the securing device from its securing position, the coupling magnet of the removal tool being movable within the casing from a retracted position to a coupling position for magnetically coupling with the securing device;
  a further magnet; and
  a movable magnet slidable relative to the further magnet, the further magnet and the movable magnet being housed in the casing with the coupling magnet, and the coupling magnet and the movable magnet being connected together for drawing of the movable magnet into a magnetically repelling relationship with the further magnet to dampen the movement of the coupling magnet from its retracted position to its coupling position, and wherein the magnetic coupling of the coupling magnet with the securing device provides for withdrawal of the securing device from its securing position with withdrawal of the removal tool.

The coupling magnet of the removal tool can be for magnetically coupling with a cap of the securing device connected to the magnet of the securing device by a plunger.

In other embodiments the coupling magnet of the removal tool can be for magnetically coupling with the magnet of the securing device.

In yet further embodiments the coupling magnet of the removal tool can be for magnetically coupling with a further magnet of the securing device, the further magnet being connected to magnet of the securing device magnetically retaining the securing device in its position securing the first and second objects together.

Typically, in embodiments of the removal tool one of the further magnet and the coupling magnet of the removal tool is slidably received by the other of those magnets, and wherein the further magnet and the coupling magnet are oppositely poled to one another. Typically, the further magnet of the removal tool is retained in a fixed position within the casing of the removal tool.

In at least some embodiments of the removal tool the coupling magnet can be enclosed in a magnetically attracted material for enhancing magnetic field strength generated by the coupling magnet, and wherein an outwardly directed face of the coupling magnet remaining exposed for the magnetic coupling with the removal tool.

Typically, the removal tool further comprises a pulling handle for pulling the removal tool away from the securing device to withdraw the securing device from its securing position.

A removal tool in accordance with the invention can also additionally comprising a release handle movable from an initial position with the movement of the coupling magnet from its retracted position to its coupling position and for being returned to its initial position to withdraw the coupling magnet into the casing to effect separation of the coupling magnet from the securing device and thereby release of the securing device from the removal tool. The release handle may be formed by at least one handle member, the handle member passing from within the casing of the removal tool through a respective slot formed in the casing, the slot being orientated in the lengthwise direction of the casing and the movement of the release handle along the casing from its initial position being limited by the length of the slot.

The casing of the removal tool may be formed from any suitable essentially non-magnetic material, such as a suitable austenitic metal.

In yet another aspect of the invention there is provided a method for removing a securing device magnetically retained in position securing first and second objects together by a magnet of the securing device to permit separation of the first and second objects, the method comprising:
  providing a removal tool for removing the securing device from its securing position, the removal tool comprising a casing and a coupling magnet for magnetically coupling with the securing device by magnetic attraction of the coupling magnet for the securing device to facilitate withdrawal of the magnet of the securing device and thereby the removal of the securing device from its securing position, the coupling magnet of the removal tool being movable within the casing from a retracted position to a coupling position for magnetically coupling with the securing device;
  placing the removal tool on the securing device;
  magnetically coupling the coupling magnet and the securing device with movement of the coupling magnet from its retracted position to its coupling position; and
  withdrawing the removal tool with the securing device magnetically coupled with the coupling magnet of the removal tool.

Typically, the first and the second objects are first and second components for being held together in an assembly of those components.

The first and second components can, instance, be a tooth and an adaptor of a mining or excavation bucket for the tooth.

In other embodiments, the first and second components can be a wear plate and an adaptor for the wear plate.

In still other embodiments, the first and second components are machinery components.

In at least some embodiments, one of the first and second components can be pivotable relative to the other of the components when the components are secured together by a securing device as described herein.

As will be understood, the term "magnetic coupling" is used herein in the context of a magnetic bond with a magnetically attracted material arising from magnetic attraction for the magnetically attracted material. Similarly, "magnetically coupling" is used herein in the context of forming a magnetic bond with the magnetically attracted material.

By employing magnetic coupling of the moveable magnet as described herein, one or more embodiments of the securing device described herein provide for rapid installation and removal of the securing device in use. The use of a mechanical fastener for retaining the device in position in use and associated disadvantages as described above may also be avoided. Advantageously also, as the cap in securing devices as described herein may inhibit dirt and external detritus from caking about the device when located in position in the assembly of the first and second components in embodiments as described herein, accessing and removal of the device may also be enhanced. Also, as magnets as described herein are employed, wear and maintenance of the device may also be minimised.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers, integers or steps.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed in Australia or elsewhere before the priority date of this application.

The features and advantages of the present invention will become further apparent from the following detailed description of exemplary embodiments of the invention together with the accompanying drawings.

BRIEF DESCRIPTION OF THE ACCOMPANYING DRAWINGS

FIG. 1 is a cross-sectional end view of a securing device embodied by the invention;

FIG. 2 is an exploded view of the securing device of FIG. 1;

FIG. 9 is diagrammatic view from above of a first component and a second component secured together by a pair of further securing devices embodied by the invention;

FIG. 10 is a diagrammatic side view of the first and second components of FIG. 9 secured to one another;

FIG. 11 is a diagrammatic view from above of another securing device and securing assembly embodied by the invention;

FIG. 12 is a diagrammatic side view of the first and second components of FIG. 11 secured together;

FIG. 13 is a diagrammatic view from above of another securing device and securing assembly embodied by the invention;

FIG. 14 is a side view of the first and second components of FIG. 13 secured together;

FIG. 15 is a diagrammatic side view of the holding pin of the securing assembly of FIG. 13;

FIG. 18 is a diagrammatic side view of another securing device embodied by the invention having a moveable ring magnet and a cylindrical magnet retained in a fixed position, the moveable ring magnet being shown in its initial position;

FIG. 19 is a diagrammatic side view of the securing device of FIG. 18 showing the moveable ring magnet in its working position;

Figure 20A:
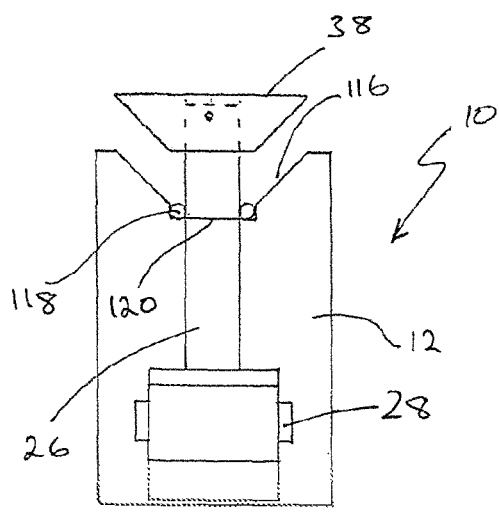
Figure 20B:
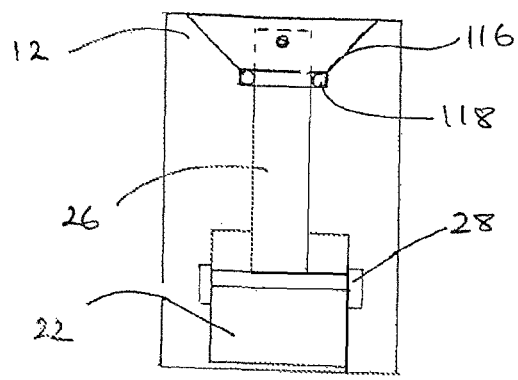
Figure 20C:
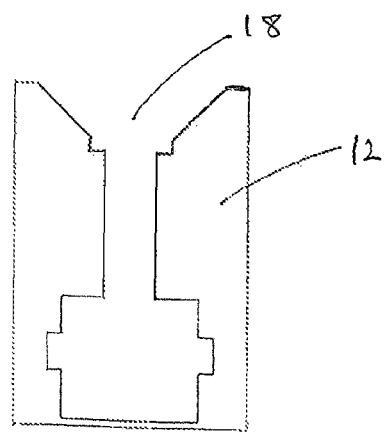
Figure 32:
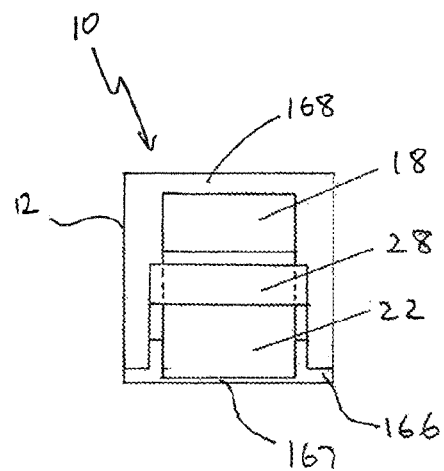
Figure 33:
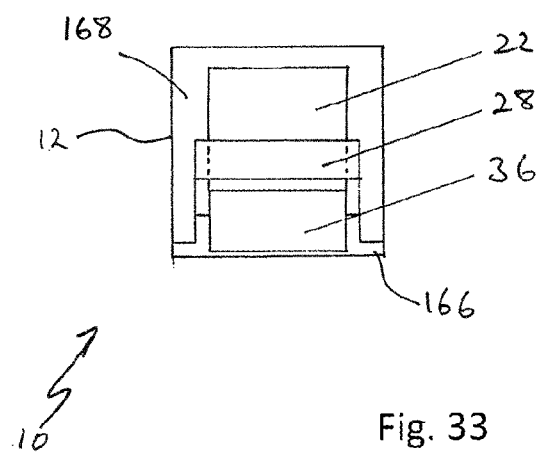
Figure 36:
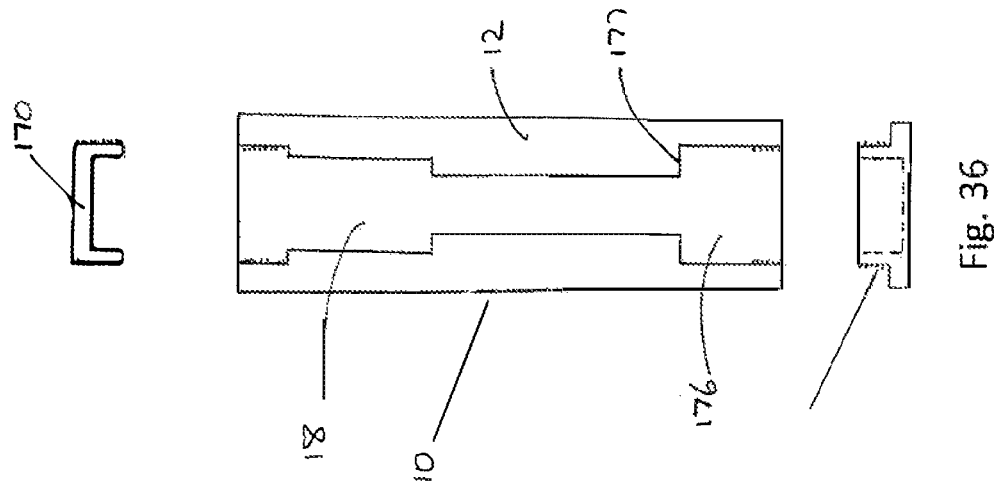
Figure 35:
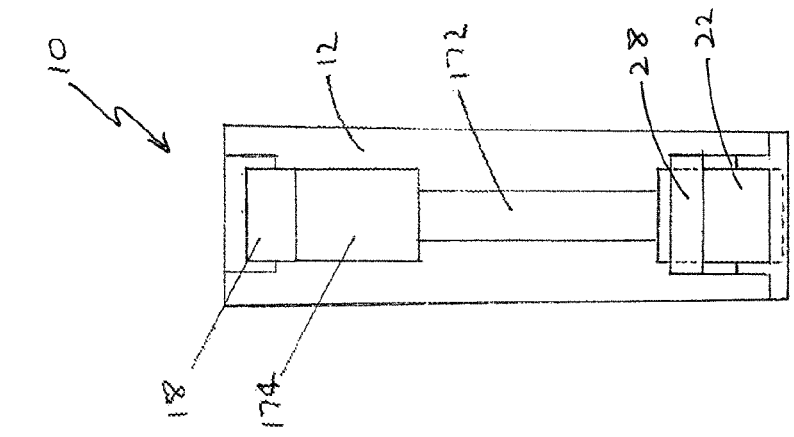
Figure 34:
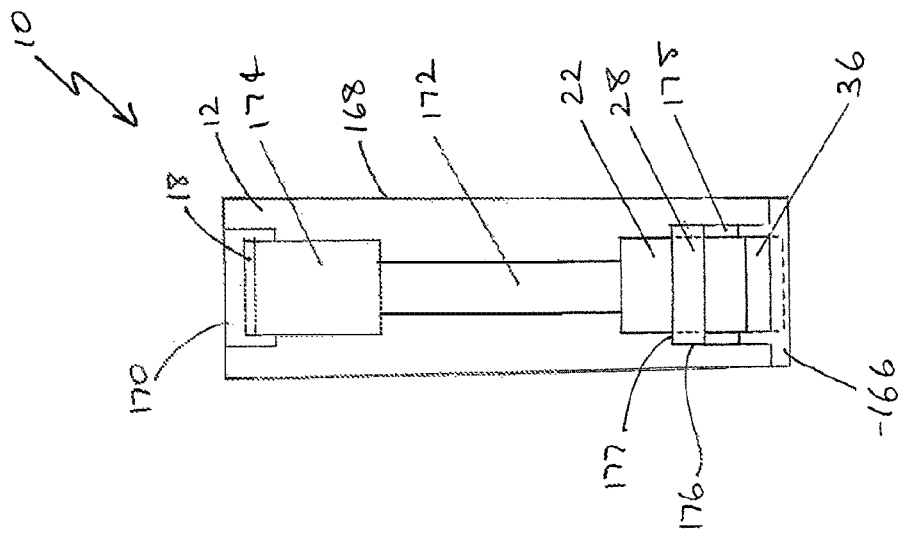
Figure 37:
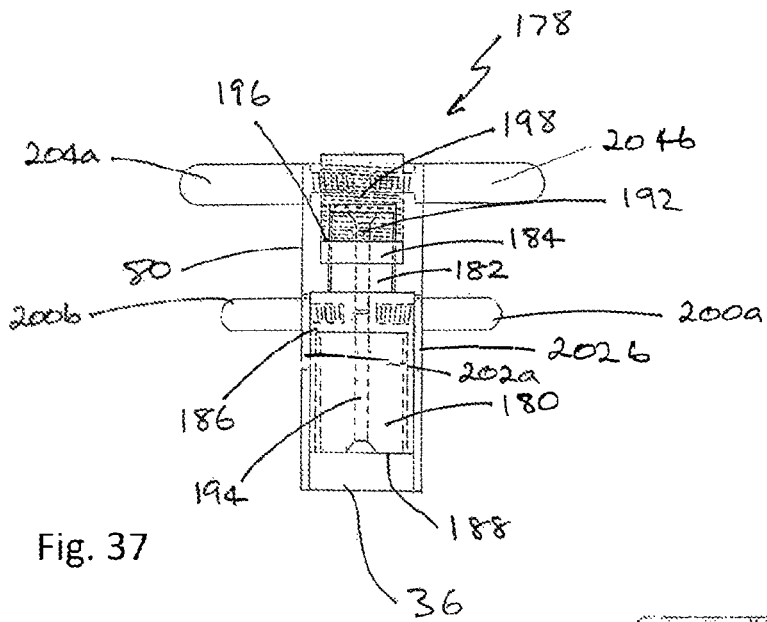
Figure 38:
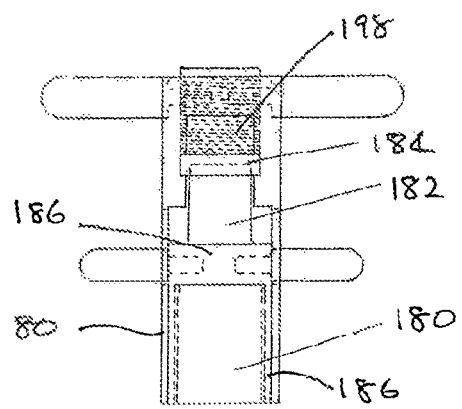
Figure 39:
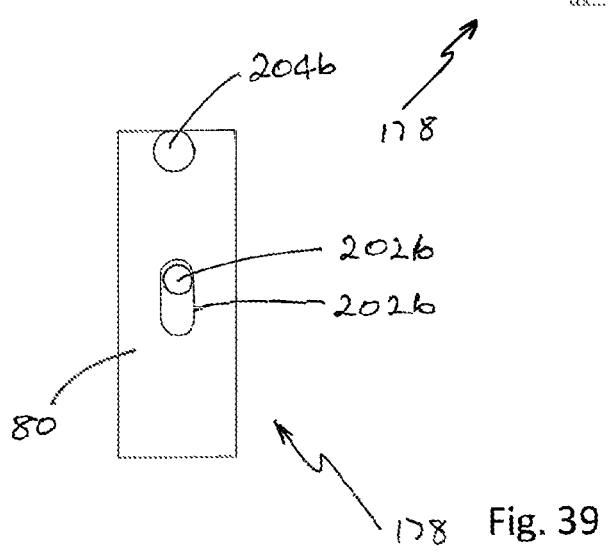

FIG. 20A is a diagrammatic side view of yet another securing device embodied by the invention showing the plunger of the device in its initial resting position. FIG. 20B shows the plunger of this embodiment in its working position. FIG. 20C is a diagrammatic side view illustrating the casing of this device;

FIG. 21A shows a cutting edge secured to a support plate by securing devices of the type shown in FIG. 20A;

FIG. 21B is a diagrammatic side view illustrating a securing device (shown in phantom outline) of FIG. 20A securing the cutting edge to the support plate of FIG. 21A;

FIGS. 22A-B, 23A-B, 24-26, 27A-B, 28A-B, and 29-31 are diagrammatic views illustrating alternative magnet arrangements of embodiments of securing devices as described herein;

FIG. 32 is a diagrammatic side view of a further securing device embodied by the invention having a fixed ring magnet and in which a movable cylindrical magnet is in its working position;

FIG. 33 is a diagrammatic side view showing the cylindrical magnet in its initial position;

FIG. 34 is a diagrammatic view of a yet further securing device embodied by the invention having a fixed ring magnet and in which a movable cylindrical magnet in its initial position;

FIG. 35 is a diagrammatic side view showing the cyclindrical magnet in its working position;

FIG. 36 is an exploded diagrammatic view of the casing of the securing device of FIGS. 34 and 35;

FIG. 37 is a diagrammatic side view of another tool for removing a securing device of the invention from its in use position showing the removal tool in an at rest configuration;

FIG. 38 is a diagrammatic side view of the removal tool of FIG. 37 in an active configuration; and FIG. 39 is a diagrammatic side view of the removal tool of FIG. 36.

DETAILED DESCRIPTION OF EXEMPLARY EMBODIMENTS OF THE INVENTION

A securing device 10 embodied by the invention is illustrated in FIG. 1. The device 10 comprises a casing 12 formed from a non-magnetic material having a top 14 and a bottom 16, and an internal cavity 18 which opens to the top of the casing. A plunger 20 which is also formed from an essentially non-magnetic material (i.e., a material that is not, or is essentially not, attracted by a magnet) is disposed in the cavity and to one end of which is secured a permanent cylindrical magnet 22 by a fastener 24, the fastener being threadably engaged with an internal mating thread defined in plunger shaft 26 thereby fixedly securing the cylindrical magnet to the plunger shaft. A permanent ring magnet 28 is seated on the internal circumferential ledge 30 of the casing and is held stationary against the ledge by a retaining element in the form or a locking ring 32 threadably engaged with a corresponding female thread 34 defined in the casing wall. The cylindrical magnet 22 is partially received in an underside hollow of the locking ring 32 and the plunger shaft 26 slidably protrudes from a through opening 27 of the locking ring.

The cylindrical magnet 22 is received by the ring magnet 28, and the cylindrical magnet and the ring magnet are in an oppositely poled magnetic (i.e., attracted) relationship to one another (i.e., N-S, S-N or S-N, N-S) wherein the cylindrical magnet 22 is slidable back and forth within the ring magnet 28 with movement of the plunger 20 back and forth within the casing between resting and securing positions of the plunger as further described below. As can also be seen, an air space 36 is provided between the bottom of the casing and the cylindrical magnet 22.

A cap 38 fabricated from a magnetically attracted material (i.e., a ferromagnetic material) is fitted to the top end of the plunger shaft 26 and is secured in position by a retaining roll pin (not shown) inserted into the hole 40 in the plunger shaft. A sealing member in the form of an O-ring 42 is received about the cap in a groove 44 defined in the circumferential periphery of the cap and covers the retaining pin. In other embodiments, the sealing member can be a lip seal rather than an O-ring. In still yet further embodiments, a sealing member in the form of an O-ring can instead be provided in a circumferential groove defined in the inside face of the surrounding wall of the casing rather than on the cap itself.

Figure 3:
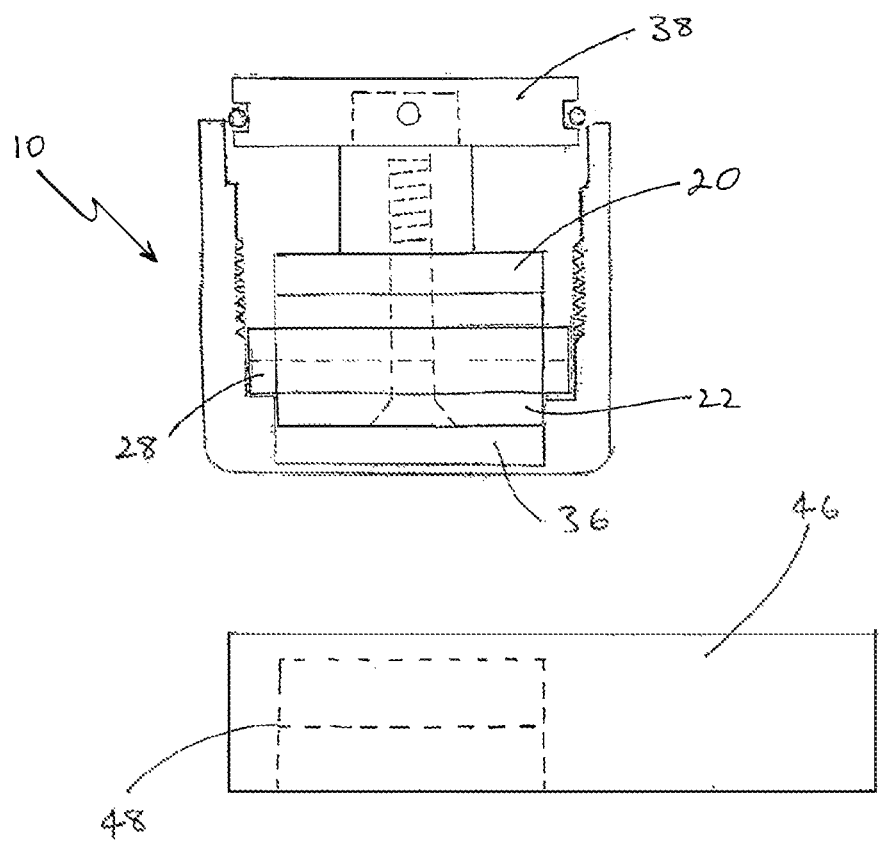
FIG. 3 is cross-section end view of a securing assembly embodied by the invention in a separated form and comprising the securing device of FIG. 1.
Figure 4:
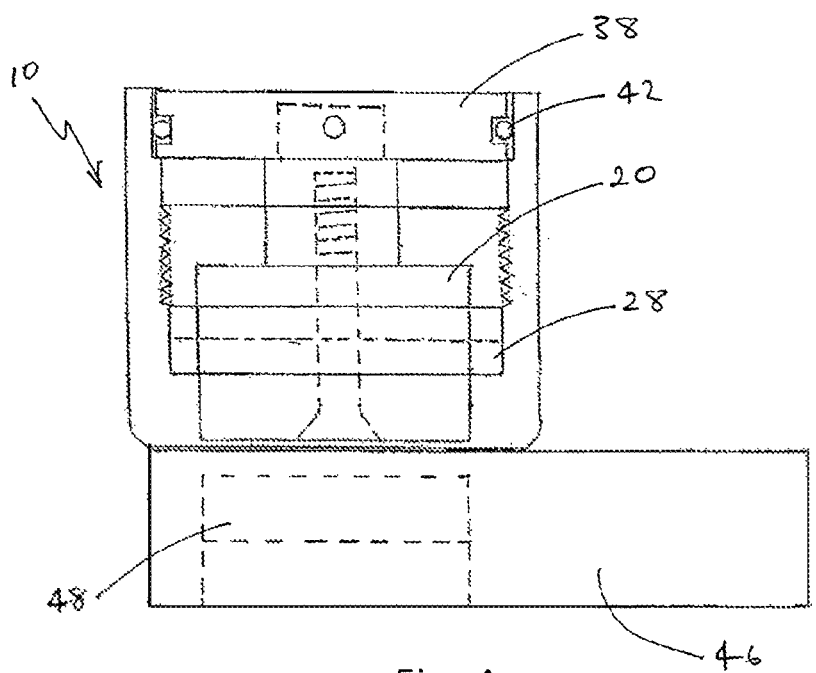
FIG. 4 is a cross-sectional end view of the securing assembly of FIG. 3 in an assembled form.

An exploded view of the securing device 10 is shown in FIG. 2 and the operation of the securing device is illustrated in FIGS. 3 and 4.

As shown in FIGS. 3 and 4, the securing device 10 in at least some embodiments of the invention is employed in combination with a retaining element in the form of a mild-steel retaining plate 46 in which is mounted a further permanent magnet 48, the securing device and the plate forming a securing assembly embodied by the invention which in at least forms, can be employed to prevent separation of first and second components as described herein from one another, thereby securing the first and second components together.

In use, the retaining plate 46 is located in position on the first component as described in greater detail below, such that the further magnet 48 is in an oppositely poled (i.e., attracted) magnetic orientation relative to the cylindrical magnet 22 (i.e., N-S or S-N). The bottom of the securing device 10 is then seated on the top of the retaining plate 46 so that the cylindrical magnet 22 of the device aligns with the further magnet 48.

Initially, the plunger 20 is in its resting position as shown in FIG. 3 whereby the cylindrical magnet 22 is located above the space 36 provided within the casing between that magnet and the bottom 16 of the casing 12.

With the positioning of the casing on the retaining plate 46, the cylindrical magnet 22 is partially, slidably drawn though the ring magnet 28 by magnetic attraction of the cylindrical magnet for the further magnet 48 whereby the cylindrical magnet is moved from its initial position into its working position in the space 36 and magnetically couples with the further magnet 48, thereby holding the securing device against the retaining plate 46. As with other embodiments of the securing device 10 as described herein, the bottom 16 of the casing has a thickness of typically about 0.5 to about 1.5 mm that is reduced compared to the surrounding side wall of the casing to facilitate the attraction and magnetic coupling of the cylindrical magnet 22 with the further magnet 48/retaining plate 46 or other magnetically attracted component as described herein.

As the cylindrical magnet 22 is drawn into its working position, the plunger 20 is likewise automatically drawn from its resting position to its securing position in which the top of the cap 38 is generally flush with the top of the casing 12 as shown in FIG. 4. In this position, the opening of the cavity 18 is closed by the cap and the interior of the cavity is substantially sealed by the O-ring of the cap, essentially preventing dust and detritus from entering the casing 12 through the cavity opening. Further, in this position, the top region of the cylindrical magnet 22 is in a repelling magnetic relationship (i.e., N-N or S-S) with the bottom region of the ring magnet 28, the magnetic attraction between the cylindrical magnet 22 and the further magnet 48 overcoming the magnetic repulsion between the cylindrical magnet and the ring magnet 28. The magnetic repulsion between the cylindrical magnet and the ring magnet that develops as the cylindrical magnet is drawn into its working position acts to dampen that movement. Likewise, the magnetic repulsion between the cylindrical and ring magnets assists the release and return of the cylindrical magnet from its working position to its initial position during removal of the securing device.

Figure 5:
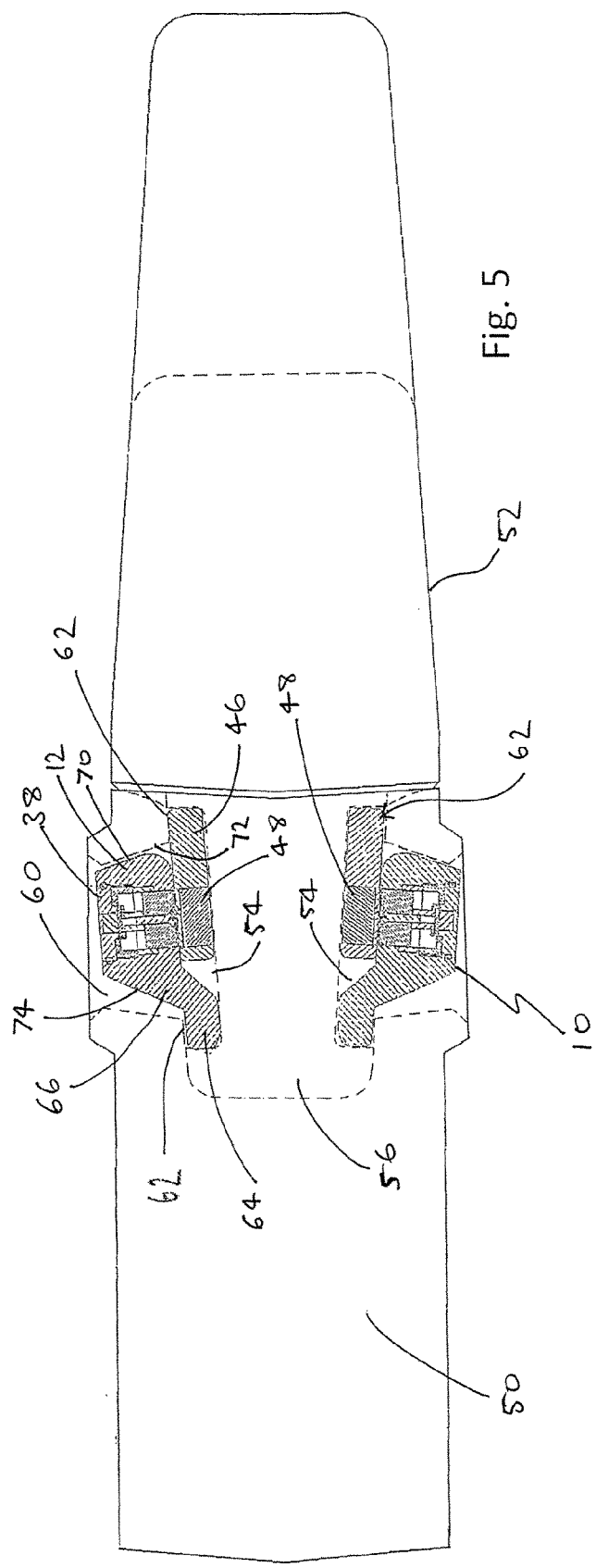
FIG. 5 is a diagrammatic view from above of a first component and a second component secured together by a pair of securing assemblies of FIG. 4.
Figure 6:
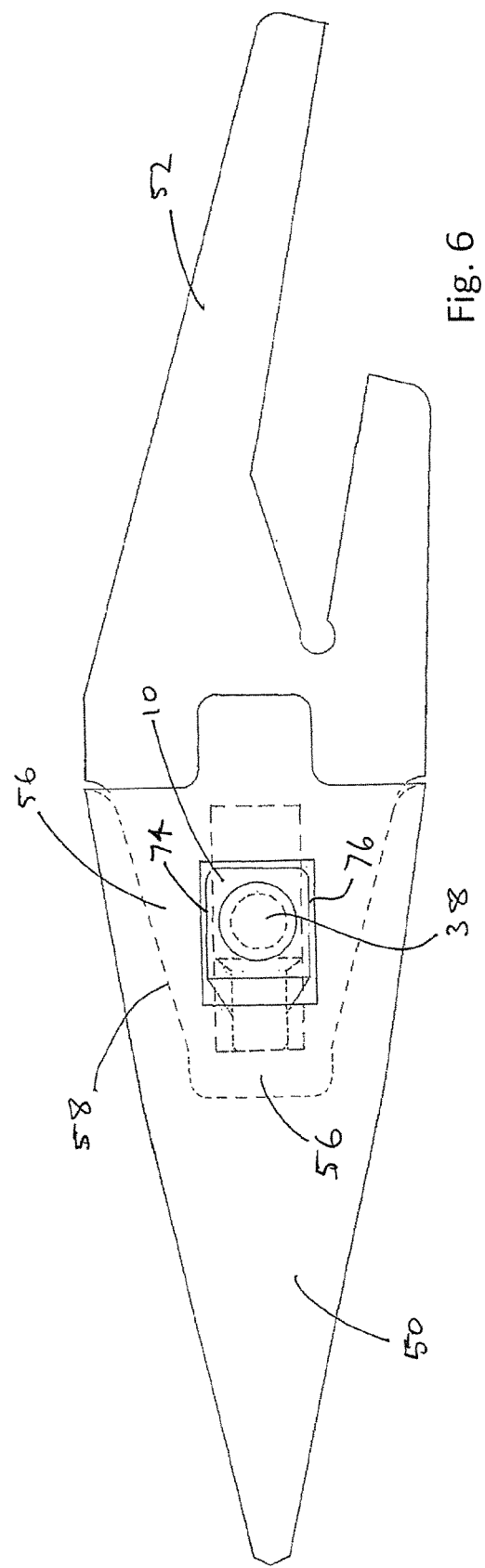
FIG. 6 is a diagrammatic side view of the assembled configuration of the first component and the second component of FIG. 5.

The use of the securing assembly shown in FIGS. 3 and 4 to secure a tooth component 50 of a mining or excavation (e.g., drag-line) bucket to another component i.e., an adaptor 52 of the bucket, is illustrated in FIGS. 5 and 6. The adaptor 52 in use is welded or otherwise fixed to the bucket in the conventionally known manner.

An opening in the form of a recess 54 is provided in the outer face of each side of the nose 56 of the adaptor for reception of a respective retaining plate 46. To secure the tooth 50 to the adaptor, a retaining plate is first located in each slot whereby each plate 46 is retained in position by the magnetic attraction of its further magnet 48 to the adaptor. The tooth 50 is then slid onto the nose 56 of the adaptor such that the nose is snugly received in the corresponding cavity 58 of the tooth as best shown in FIG. 6 whereby each recess 54 aligns with a respective through opening 60 defined in the adjacent side wall of the tooth, forming a passageway into which the a securing device is positioned in use as further described below. As shown in FIG. 5, once the tooth and the adaptor components are in their assembled configuration, one end of each retaining plate 46 is received under a respective ledge 62 of the tooth.

A securing device 10 is then inserted into one of the openings 60 at an angle such that the foot 64 of a forwardly directed protrusion 66 of the casing 12 is fitted into the recess 54 and slid under the overhanging ledge 62 provided by the tooth. With continued lowering of the casing the foot 64 slides into abutment with the front end of the recess 54 and the cylindrical magnet 22 is magnetically attracted to the further magnet 48 in the retaining plate 46 as described above as the bottom 16 of the casing is seated on the retaining plate. The plunger 20 is thereby automatically moved into its securing position whereby the opening to the internal cavity 18 of the casing 12 of the device is closed by the cap 38 as the cylindrical magnet 22 is drawn into its working position by magnetic attraction to the further magnet 48 of the retaining plate. When the casing is located in position its rear end face 70 is disposed immediately adjacent to the wall 72 defining the opening 60 of the tooth. Another securing device is then inserted through the other of the through openings 60 so as to be seated on the other retaining plate 46 in the same manner as described above.

As can be seen in FIG. 5, the front end face 74 and opposite rear face 70 of the casing 12 of each securing device 10 are inclined relative to one another so that the length of the casing increases in the top to bottom direction of the casing to facilitate the insertion of the casing 12 into position and subsequent removal of the device from the opening 60. Whilst not shown, the opposite sides 74 and 76 of the casing between the front and rear ends of the casing are inclined relative to one another so that the width of the casing decreases in the top to bottom direction of the casing to also facilitate locating the casing in position.

When in position the securing assembly comprising the securing device 10 and the retaining plate 46 prevents the withdrawal of the tooth 50 from the nose 56 of the adaptor, and so acts as a "chock" effectively locking the tooth and adaptor together. That is, withdrawal of the adaptor from the tooth is stopped by abutment of the rear end of the casing 12 with the corresponding wall 72 of the tooth whilst withdrawal of the tooth from the adaptor is stopped by abutment of the front of the foot 64 of the casing with the front end of the corresponding recess 54.

Thus, the casing of a securing device 10 as described herein is sufficiently strong, rigid and robust to prevent the withdrawal/separation of the two objects secured together by the location of the device between the two objects (in the present example, the tooth 50 and adaptor 52).

Figure 7:
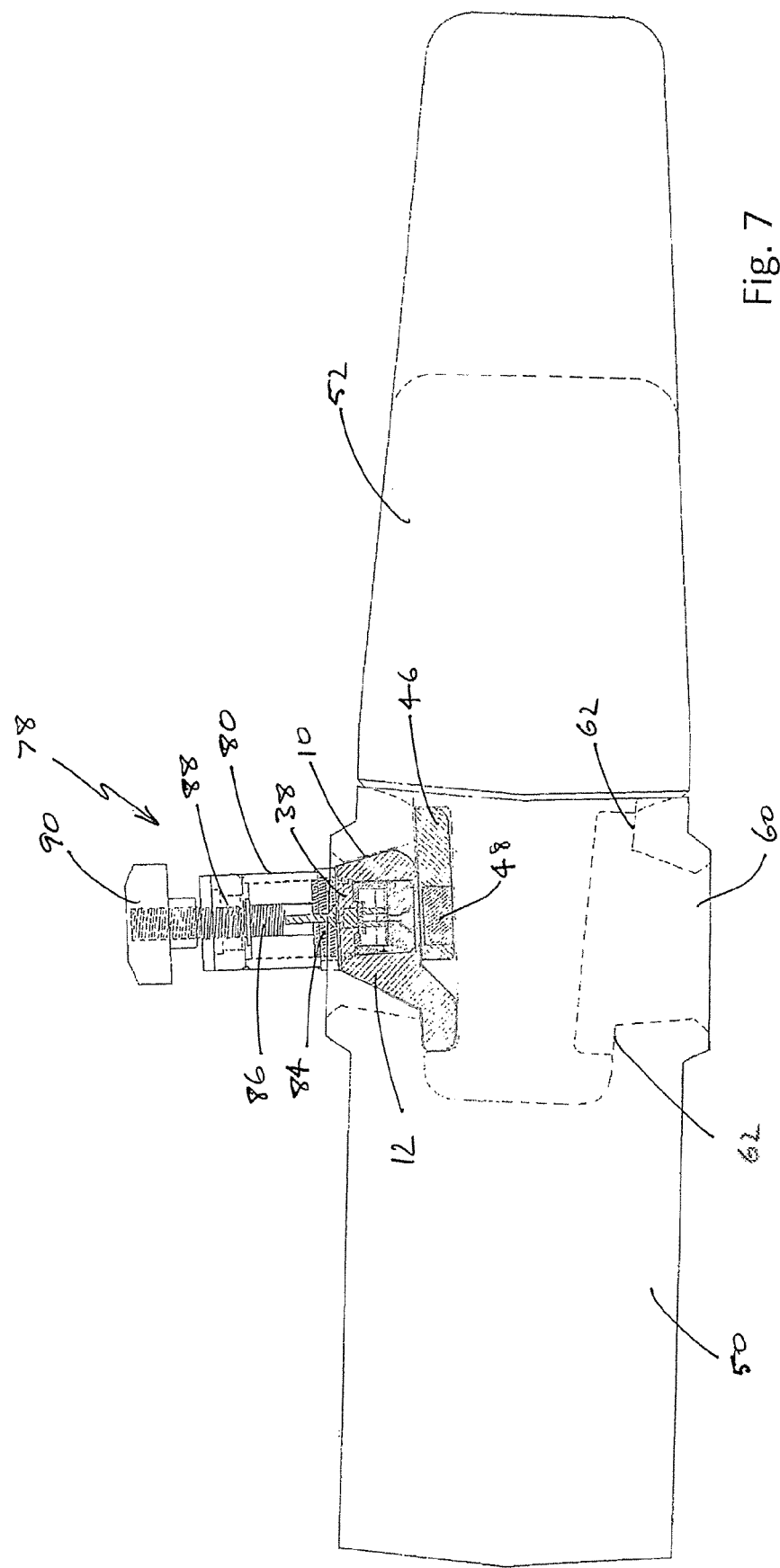
FIGS. 7 and 8 are diagrammatic side views illustrating the removal of one of the securing devices embodied by the invention from the assembled configuration of the first component and the second component of FIG. 6.
Figure 8:
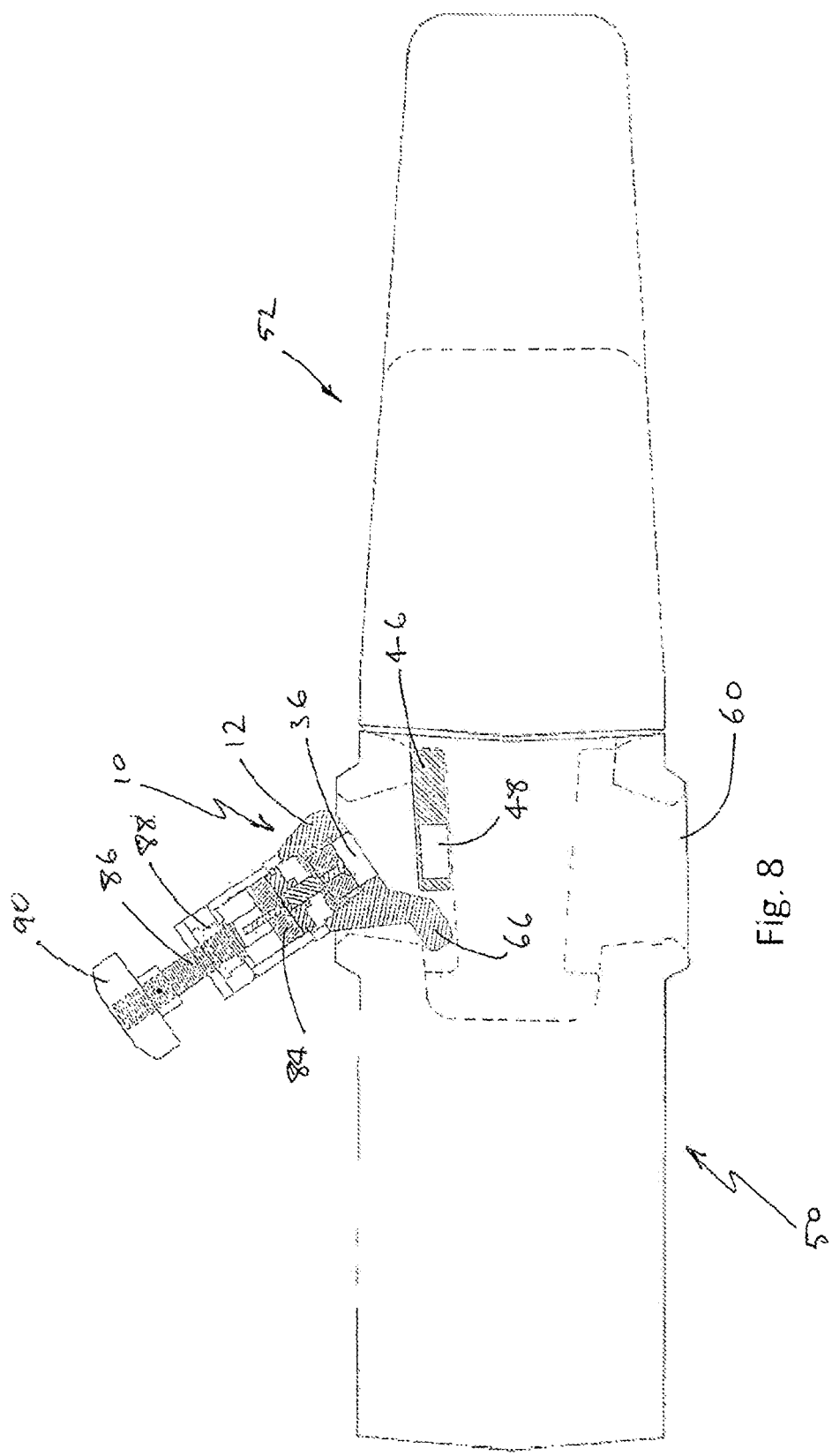

Extraction of a securing device 10 from the assembled configuration of the tooth and the adaptor is simply the reversal of the insertion of the device which can be assisted with the use of a removal tool 78 as illustrated in FIGS. 7 and 8.

In the embodiment illustrated in FIG. 7, the removal tool comprises a non-magnetic housing 80 open at a bottom end thereof and in which there is a permanent magnet 84 located on the end of a spindle 86 that is threadably received in a collar 88. The spindle protrudes from the housing and a handle 90 is mounted on the outer end of the spindle. Whilst not shown, the cylindrical magnet 84 is enclosed in a cup formed from a magnetically attracted material (e.g., mild steel) except for the outwardly directed bottom face of the magnet. The circumferential periphery of the magnet 182 is spaced from the cup as in conventionally known pot magnets. In the present embodiment, a thin layer of an epoxy is utilised to fill the spacing about the circumferential periphery of the magnet from the cup. Any suitable epoxy (e.g. an epoxy resin or adhesive) may be utilised for this purpose. As is known with conventional pot magnets, the encasing of the permanent magnet with a magnetically attracted material can substantially enhance the magnetic field generated for enhanced magnetic coupling as described herein.

Depending on which way the handle 90 is rotated, the magnet 84 is raised or lowered with the housing. To remove the securing device 10 from position on the retaining plate 46 and thereby the device from the tooth, the bottom end of the removal tool is placed on the cap 38 of the device and the magnet 84 is wound down to the cap by rotation of the handle 90 for magnetic coupling of the magnet 84 with the cap. By rotating the handle 90 of the removal tool in the opposite direction the cylindrical magnet 22 is drawn into the casing 12, and the cap and thereby the plunger 20 are also drawn toward the housing of the removal tool resulting in the cylindrical magnet being drawn away from the bottom of the casing 12 of the securing device, releasing the securing device 10 from the retaining plate 46. The lifting of the cylindrical magnet away from the retaining plate is assisted by magnetic repulsion that is generated between the cylindrical magnet and the ring magnet when the cylindrical magnet is in its working position.

The return of the cylindrical magnet to its initial position from its working position and thereby the return of the plunger of the device from its securing position to its resting position is facilitated by the common (repelling) polarity of the cylindrical magnet relative to the ring magnet 28 in the working position of the cylindrical magnet. The generation of magnetic repulsion between the cylindrical magnet 22 and the ring magnet as the cylindrical magnet is drawn into its working position likewise dampens the movement of the cylindrical magnet to that position.

In embodiments described herein, the lifting force applied to the cap 38 by the removal tool in order to release the securing device from the retaining plate is typically substantially less than the force required to dislodge the casing of an embodiment of the securing device from the surface of the magnetically attracted material to which it is magnetically coupled in use.

In the embodiment presently shown, once the securing device 10 has been released from the retaining plate, the device 10 can be lifted from the corresponding through opening 60 of the tooth by the removal tool as illustrated in FIG. 8.

The above removal process using the removal tool is repeated for the other securing device 10 on the opposite side of tooth and adaptor assembly and once both securing devices 10 have been removed, the tooth can then be slipped from the adaptor.

In other embodiments, the retaining element or plate 46 may be located or received on the adaptor in any suitable way so as to be retained in position thereon other than being located in a cavity or recess of the adaptor.

A further embodiment of a securing device 10 in accordance with the invention coupling a tooth 50 to the nose 56 of an adaptor 52 of a mining or excavation bucket is illustrated in FIGS. 9 and 10. As with the embodiment described above, this securing device also includes a cylindrical magnet 22 secured to the bottom end of a plunger 20 and received by a stationary ring magnet 28 wherein in use, the cylindrical magnet is slidable relative to the ring magnet from an initial position into a working position in a space provided in the bottom region of the casing 12 to releasably secure the tooth to the adaptor. In this embodiment, the casing 12 of the device is cylindrical and desirably tapers in its top to bottom direction for being inserted in correspondingly tapered aligned through openings 92 and 94 of the tooth and the adaptor so as to be placed in an end to end relationship with a like securing device 10a as shown in FIG. 9. The moveable cylindrical magnet 22 of the securing device 10 is oppositely poled (i.e., N-S or S-N) with respect to the cylindrical magnet 22 of the other securing device 10a whereby the cylindrical magnets are attracted and magnetically couple with one another thereby holding the securing devices 10 and 10a in position and releasably securing the tooth 50 on the adaptor. To assist location and for maintaining the securing devices 10 and 10a in position, the casing 12 of each device is provided with a flange 96 which rests on the corresponding side face of the adaptor.

Another embodiment of a securing device 10 in accordance with the invention is illustrated in FIGS. 11 and 12. In this embodiment, a single securing device 10 is used to secure the tooth 50 in position on the nose of the adaptor 52 in combination with ferromagnetic holding pin 98. In this embodiment the casing 12 is again generally frustoconical in shape and is inserted into aligned correspondingly tapered openings 100 and 102 of the tooth 50 and adaptor 52 whereby the bottom of the casing is received in a round recess provided in the side of the holding pin 98 which itself has been inserted into openings of the tooth and though the opening of the adaptor whereby the casing and the holding pin 98 are disposed substantially perpendicularly to each other. As will be understood, in this embodiment, the cylindrical magnet 22 is magnetically attracted to the holding pin 98 and magnetically couples with the holding pin, maintaining the pin in position and releasably securing the tooth to the adaptor. Other embodiments of this type can also be provided wherein the holding pin 98 is inserted into the tooth and adaptor assembly in the side to side (i.e., transverse) direction of the assembly whilst the securing device is inserted in a top to bottom direction of the assembly.

Likewise, the holding pin 98 can be provided in a shape other than as a flattened bar as illustrated in FIGS. 11 and 12.

Such an embodiment illustrated in FIGS. 13 to 15. In this embodiment, the movable cylindrical magnet 22 of the securing device is again received by the stationary ring magnet 28 and is slidable relative thereto as described above. However, in this instance, the bottom of the casing 12 is concaved for mating with the ferromagnetic round holding pin 98 in a circumferentially directed groove 112 of the pin as best shown in FIG. 15. In this embodiment, the cylindrical magnet can likewise be concaved at its bottom end for enhancement of the magnetic coupling of that magnet with the holding pin 98. A side view of the holding pin 98 is illustrated in FIG. 15. Whilst the holding pin 98 in this embodiment can therefore rotate about its longitudinal axis relative to the securing device 10, the pin is nevertheless held in position within the tooth and adaptor assembly by the securing device 10 by virtue of the reception of the casing 12 within the circumferentially directed groove of the pin.

Figure 16:
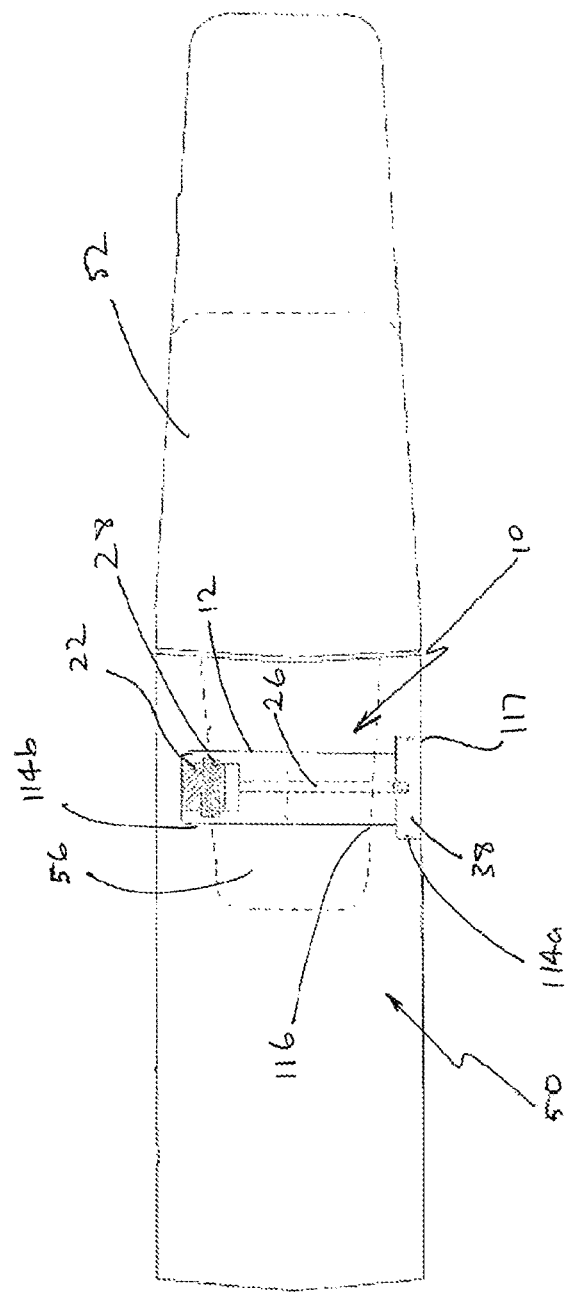
FIG. 16 is a diagrammatic view from above of first and second components secured together by another securing device embodied by the invention.

Yet another embodiment of the invention is illustrated in FIG. 16 with respect to the securing of a tooth 50 to an adaptor 52 of a mining excavation bucket. In this embodiment, the casing 12 of the securing device 10 is elongated and is inserted into aligned openings 114a and 114b of the tooth 50 the second of which is blind, via through opening 114a of the nose 56 of the adaptor 52. The securing device 10 in this embodiment thereby acts as a magnetic holding pin and the tooth is secured to the adaptor by the securing device without the need for a separate holding pin 98. As also illustrated in FIG. 16, the cylindrical magnet 22 when in its working position magnetically couples with the ferromagnetic material (e.g., steel) from which the adaptor is made. Further, in this embodiment, the cap 38 of the securing device 10 is located in a recess 116 defined in the side face of the tooth 50 when the cylindrical magnet 22 is in its working position as shown in FIG. 16 whereby the top of the cap is substantially flush with the side face of the tooth.

Whilst the above embodiments are described in the context of securing a tooth to an adaptor of a mining or excavation bucket, the invention is not limited thereto and securing devices 10 have a range of applications such as securing wear plates (e.g., comprising a tough and highly wear resistant ceramic or alloy material overlaid on a less dense material such as a mild steel or chromium steel plate) to equipment or a chute, bin, hopper, bucket or other material handling component to protect that component from abrasive material (e.g., rock, ore, minerals or the like) with which it would otherwise come into contact with in use. Typically, in such embodiments, the securing device is fitted into an aligned through opening and recess or slot of the wear plate and component assembly to secure the wear plate and the component to one another in the manner as described above.

In further embodiments, a securing device in accordance with the invention can be used for securing a first component to a second component wherein the first and the second components can pivot relative to one another. Such embodiments have application, for example, as a linkage pin for securing a pivoting component of machinery such as an excavator, backhoe or the like to a fixed component of the machinery. An example of such an embodiment is shown in FIG. 17.

Figure 17:
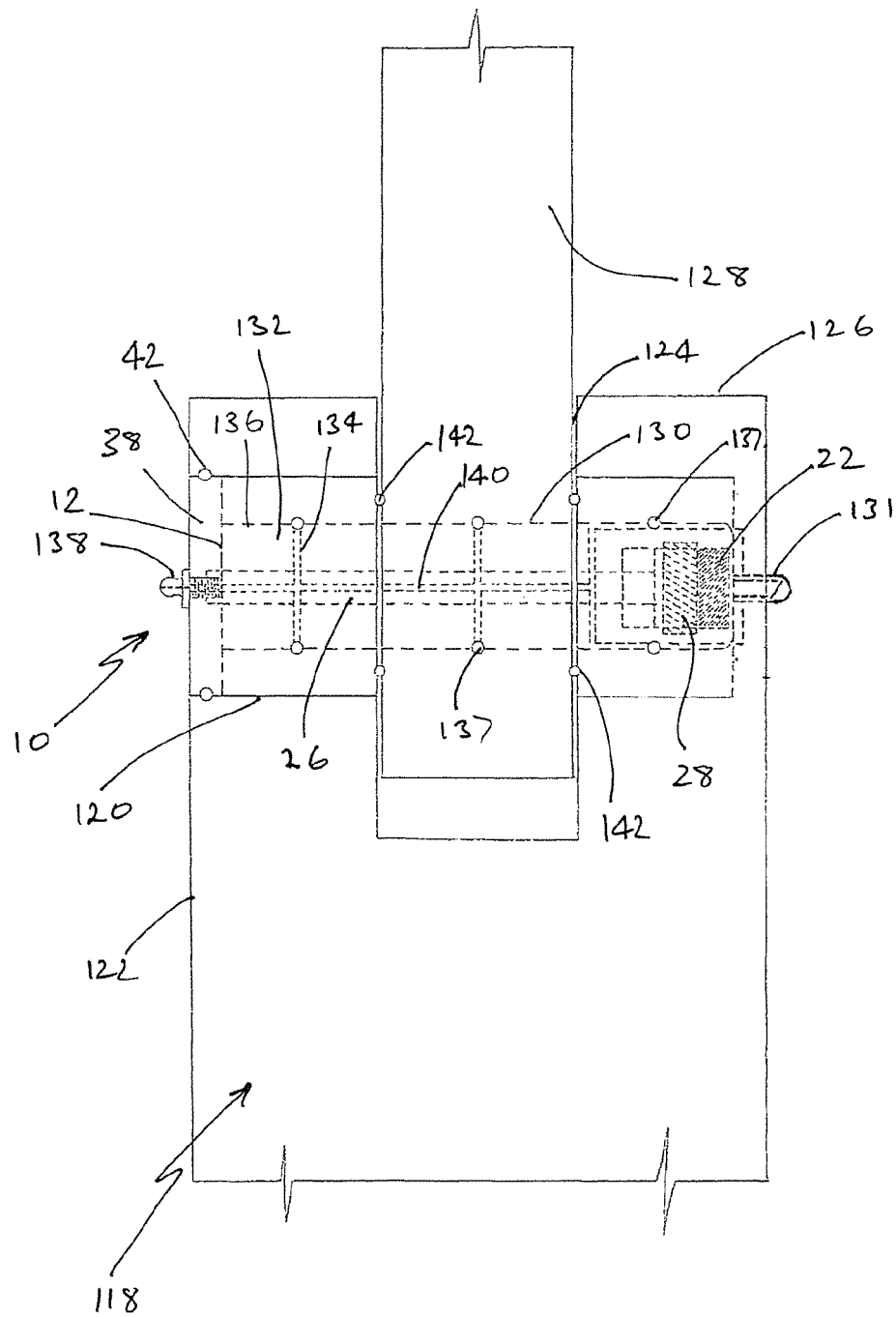
FIG. 17 is a diagrammatic view from above of first and second components secured together by another securing device embodied by the invention, the securing device allowing for one of the components to pivot relative to the other of the components.

As shown in FIG. 17, the stationary part 118 has a cavity 120 which opens to one side 122 of that part, and a recess 124 in a front end 126 in which the pivoting part 128 is located. The securing device 10 is inserted into the cavity 120 and extends entirely through the through passageway 130 of the pivoting part 128 whereby the bottom of the casing 12 of the device is in abutment with the side wall defining the bottom of the cavity 120. As will be understood, the pivoting part 128 is pivotable relative to both the securing device 10 and the stationary part 118.

The cylindrical magnet 22 is shown in its working position in FIG. 17 in which it is magnetically coupled to the ferromagnetic material of the end wall of the stationary part 118, whereby the cap 38 is in its closed position by virtue of its connection to the cylindrical magnet 22 via the plunger shaft 26. As also shown, the surrounding side wall 132 of the casing 12 in this embodiment is relatively thick and includes radially directed channels 134 which open to the exterior 136 of the side wall of the casing. The channels 134 are in communication with a one-way inlet valve in the form of a lubrication nipple 138 securing the cap 38 to the plunger 20 via central longitudinal channel 140 of the plunger shaft 26, and open to circumferential grooves defined in the exterior of the side wall 132 forming grease/lubrication lines 137. The longitudinal channel 140 and the radially directed channels 134 form conduits for the passage of grease or other lubricant to the exterior of the side wall of the casing 12 to allow for periodic lubrication of the exterior of the side wall, including between the casing and the pivoting/pivotable part 128. A one-way valve 131 protrudes from a through passageway of the stationary part for passage of excess grease from the assembly. The sealing means in the form of O-ring 42 about the circumferential periphery of the cap 38 closes the cavity though again, it will be understood that a lip seal or other suitable seal may be used instead. Sealing means in the form of further O-ring seals 142 also protect the securing device 10 from external dust and other detritus.

In each of the embodiments of the securing device 10 and 10a described above, the movable cylindrical magnet 22 is drawn into its working position by magnetic attraction of that magnet to e.g., a retaining plate 46, a ferromagnetic material such as a holding pin 98, or an oppositely poled cylindrical magnet such as that of another securing device 10 (e.g., magnet 22), as described above. However, in other embodiments, the cylindrical magnet can be moved to its working position by manually depressing the cap 38 to drive the plunger 20 downwardly whereby the cylindrical magnet is then retained in its working position and the securing device is held in position, by the cylindrical magnet magnetically coupling with the retaining plate 46, ferromagnetic holding pin 98 or oppositely poled magnet. Whether the cylindrical magnet 22 is automatically drawn into its working position by magnetic attraction of that magnet or the cap 38/plunger 20 needs to be depressed in order to at least initiate the movement of the cylindrical magnet into its working position depends on the size and magnetic field strength of the cylindrical magnet 22 and the ring magnet 28 relative to one another, as well as the nature of the material to which the cylindrical magnet 22 is attracted. Generally, if the magnetic field of the ring magnet 28 is weaker than that of the cylindrical magnet 22, the cylindrical magnet will typically be automatically drawn by magnetic attraction to its working position in use. Likewise, if the magnetically attracted material to which the cylindrical magnet 22 is magnetically coupled in its working position is only relatively thin or the cylindrical magnet is only attracted to that material relatively weakly, the movement of the cylindrical magnet to its working position in that instance may not be automatic. Persons in the field to which this invention relates will be able to determine the size and magnetic field strength of the cylindrical magnet 22 and the ring magnet 28 for either automatic or manually driven movement of the cylindrical magnet into its working position to suit the particular application of the securing device 10 in use.

Also, whilst the cylindrical magnet 22 is moveable and the ring magnet 28 is held in a stationary position in the above described embodiments, in other embodiments of the invention the cylindrical magnet 22 may be held in a stationary position and the ring magnet 28 is moveable from an initial position to a working position in use. An example of such an embodiment is illustrated in FIGS. 18 and 19.

As shown in FIG. 18, the casing 12 of the device 10 is again elongate in shape. In this embodiment though the ring magnet 28 is secured to the base 144 of the plunger 20 by mechanical fasteners indicated by the numeral 146 and so is moveable between initial and working positions relative to the cylindrical magnet 22 with travel of the plunger within the casing as described further below. The ring magnet is shown in its resting position in FIG. 18 with a circumferential air space 36 provided between the end of the cavity of the casing and the bottom of the ring magnet. The cylindrical magnet is securely mounted in a fixed position on a raised rest 148 of the casing and is received by the ring magnet 28. A recess 150 is formed in the base of the plunger 20 for reception of a top portion of the cylindrical magnet 22 when the plunger is moved to its securing position as shown in FIG. 19.

When not in use, the ring magnet 28 is in its initial position and receives the cylindrical magnet 22, and the cap 38 is spaced from the top of the casing. The ring magnet and the cylindrical magnet are oppositely poled (e.g., N-S, S-N or S-N, N-S) and in the initial resting position of the ring magnet, the ring magnet and the cylindrical magnet are attracted to one another.

In use, the casing of the device is placed on a magnetically attracted material as in embodiments described above such as a sheet or plate 164 of ferromagnetic material (e.g., a mild-steel retaining plate). To secure the device 10 to the sheet, the cap 38 is depressed moving the ring magnet 28 to its working position with the travel of the plunger 20 to its securing position (or the ring magnet is otherwise automatically drawn into its securing position), wherein the ring magnet is magnetically coupled to the plate 164. In this position, the ring magnet is repelled by the cylindrical magnet (i.e., the magnets are N-N or S-S to each other) but the magnetic coupling of the ring magnet secures the device to the ferromagnetic plate.

Yet another embodiment of a securing device 10 in accordance with the invention is illustrated in FIG. 20A. In this embodiment, the cap 38 is again formed from a magnetically attracted material but in this instance, the circumferential periphery of the cap is tapered to seat on a correspondingly tapered wall 116 defined in the top 14 of the casing 12 of the device as shown in FIG. 20B. A sealing member in the form of an O-ring 118 is located in position under the cap in a recess 120 adjacent the bottom end of the tapered wall and receives the plunger shaft 26 to seal the cavity of the casing against entry of dirt and detritus. Locating the O-ring in this position also protects it against mechanical damage. A diagrammatic longitudinal cross-sectional view of the casing 12 of this embodiment is illustrated in FIG. 20C. In this embodiment the ring magnet 28 is retained in a fixed position. However, it will be understood that as with other embodiments as described herein, forms of the device may be provided in which the cylindrical magnet 22 is movable between initial and working positions whilst the ring magnet is retained in a fixed position within the casing.

A cutting edge 120 secured to a support plate 122 by a pair of spaced apart securing devices 10 of the type shown in FIG. 20A is illustrated in FIG. 21A. As best illustrated in FIG. 21B, each securing device is received in a respective passageway 124 which extends through the support plate from the outer surface of the cutting edge. In practice, the support plate can for instance be the lip of an excavation bucket. Likewise, rather than a cutting edge as shown, one or more securing devices of the type shown in FIG. 20A may be used to secure a replaceable excavation tooth to the lip of an excavation bucket or more generally, to an adaptor of an excavation bucket for the tooth.

Figure 22A:
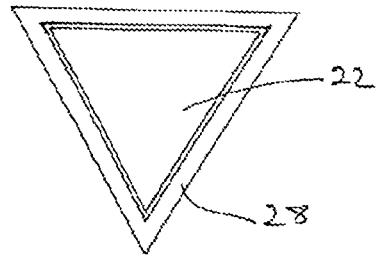
Figure 22B:
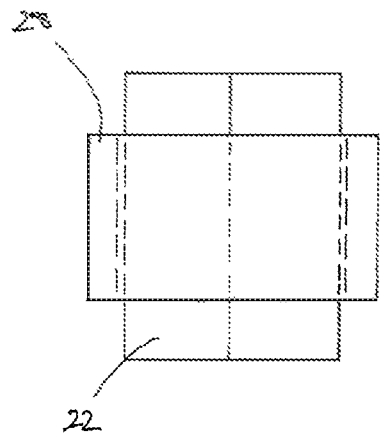
Figure 23A:
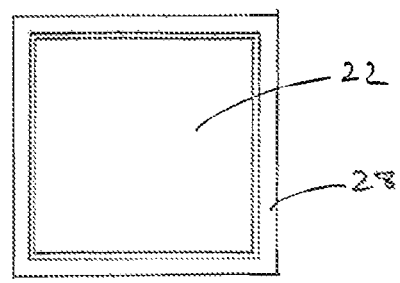
Figure 23B:
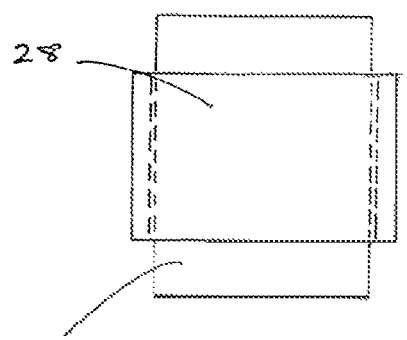

Whilst in embodiments described above the first magnet and the moveable magnet (e.g., the ring magnet 28 and the cylindrical magnet 22) are each respectively provided as a single magnet, in other embodiments the first magnet and/or the moveable magnet may be provided in a number of respective magnet sections that may be spaced apart from one another but which are arranged to function together. It is also not essential that the first magnet and the moveable magnet are each circular in transverse cross-section, and magnets having other transverse cross-sectional shapes may be used in embodiments of the invention. Examples of embodiments of such magnet arrangements are illustrated in FIG. 22A in which the respective magnets have a triangular transverse cross-sectional profile and FIG. 23A in which the magnets each have a square transverse cross-sectional profile. A diagrammatic side view of these magnet arrangements is illustrated in FIG. 22B and FIG. 23B, respectively.

Figure 24:
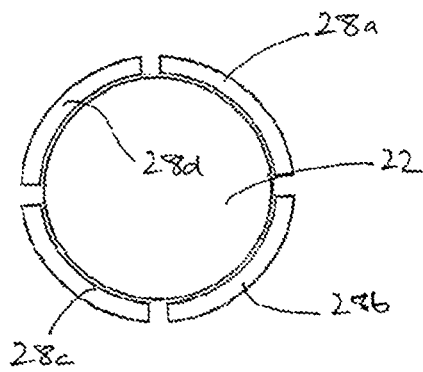
Figure 25:
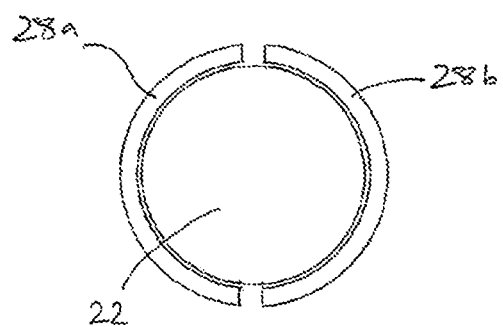
Figure 26:
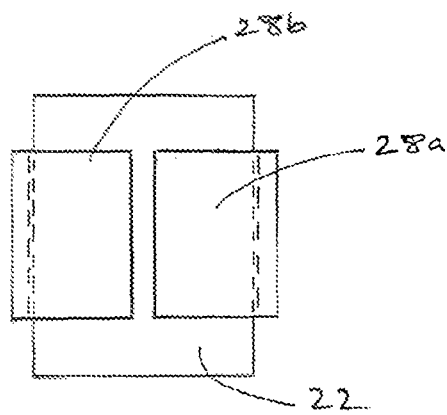

In FIG. 24 the ring magnet is shown provided in four sections 28a-d spaced apart from one another around the cylindrical magnet 22. In FIG. 25, the ring magnet is provided in two sections 28a-b. A diagrammatic side view of the magnet arrangement of FIG. 24 or FIG. 25 is illustrated in FIG. 26. Further, such magnet arrangements are shown in FIGS. 27-28.

Figure 27A:
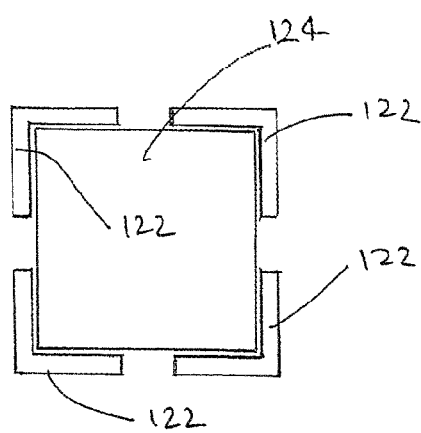
Figure 27B:
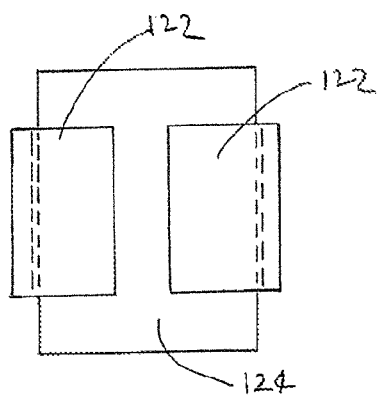
Figure 28A:
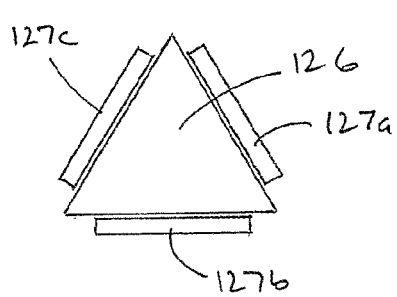
Figure 28B:
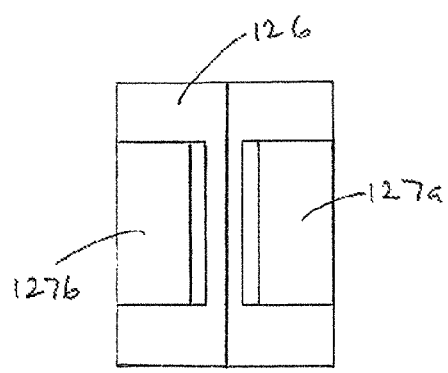

More particularly, FIG. 27A illustrates an arrangement in which spaced apart L-shaped magnets 122 functioning as a ring magnet 28 are positioned about the corners of a square shaped magnet 124 functioning as a cylindrical magnet 22. A diagrammatic side view of this magnet arrangement is shown in FIG. 27B. In FIG. 28A, the magnet arrangement comprises a triangular shaped magnet 126 about which are positioned flat magnets 127a-c functioning as a ring magnet and which are respectively disposed adjacent a corresponding face of the triangular magnet 126. A diagrammatic side view of this magnet arrangement is illustrated in FIG. 28B.

Figure 29:
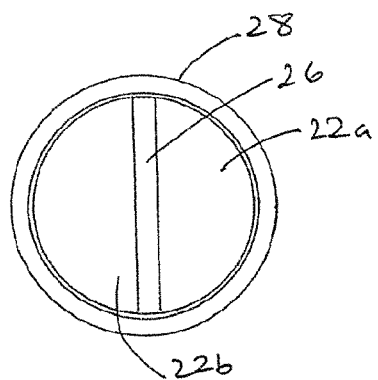
Figure 30:
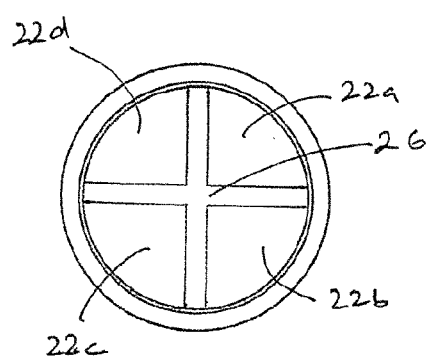
Figure 31:
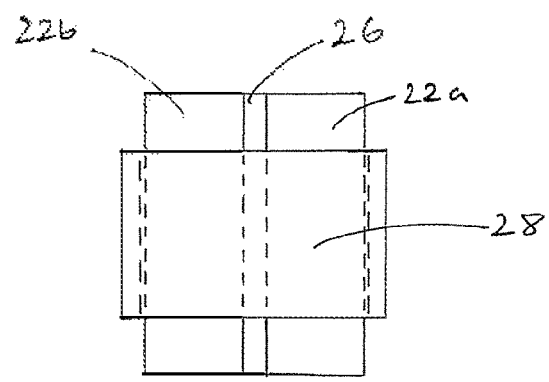

Examples of embodiments in which the cylindrical magnet 22 is provided in a number of sections are illustrated in FIG. 29 and FIG. 30. As can be seen, in FIG. 29 the cylindrical magnet is provided in two sections 22a-b whilst in FIG. 30 the cylindrical magnet is in four sections. In at least some embodiments, the magnet sections can be secured to the plunger shaft 26 as shown. A diagrammatic side view for the magnet arrangement of FIG. 29 or FIG. 30 is illustrated in FIG. 31.

A yet further embodiment of a securing device 10 as described herein is illustrated in FIG. 32. This embodiment has a short casing 12 which includes a removable base in the form of a closure plug 166 that is threadably received by a mating female thread of the casing and so is readily removable from the main body 168 of the casing 12 by unscrewing the base from the main body. In this embodiment, the plug 166 is again formed from the same essentially non-magnetic material from which the main body 168 of the casing 12 is formed. As shown, the floor 167 of the plug again has a reduced thickness (i.e., a thickness of typically from about 0.5 mm to about 1.5 mm) compared to the surrounding side wall of the plug to facilitate the magnetic coupling of the cylindrical magnet 22 for retention of the casing/securing device in its in use position as described above in relation to other embodiments of the invention. In other embodiments, the plug may be formed from a magnetically attracted (e.g., ferric) material. In this instance, a stronger permanent cylindrical magnet 22 may be utilised to account for possible loss of magnetic coupling strength as a result of flux of that magnet being at least partially redirected by the magnetic attracted material from which the plug is formed. As also further illustrated in FIG. 32, the embodiment shown does not include a plunger 22 or plunger cap 38. Rather, the top end of the casing 12 is integrally formed with the surrounding side wall of the casing.

As with other embodiments as described above, in the embodiment illustrated in FIG. 32 the ring magnet 28 again slidably receives the cylindrical magnet 22 and is retained in a fixed position within the casing. In its initial position the cylindrical magnet is located in the upper end of the internal cavity 18 of the casing 12 as illustrated in FIG. 33, and there is an air space 36 between the plug and the bottom of the cylindrical magnet. In use, the cylindrical magnet is automatically slidably drawn through the fixed ring magnet 28 into the air space 36 from its initial position to its working position as shown in FIG. 32 by attraction to the magnetically attracted material to which it magnetically couples which may e.g., be an adaptor 52 or a retaining plate 46 as in embodiments described above, for holding the securing device 10 in its in use position.

Another embodiment of a securing device 10 which operates similarly to that shown in FIGS. 32-33 is illustrated in FIGS. 34-36. In this embodiment though the casing 12 is longer than that of the embodiment illustrated in FIGS. 32-33 and has a removable bottom closure member in the form of plug 166 as well as top closure member in the form of plug 170, both of which are threadably mated with corresponding female threads provided in the opposite ends of the main body 168 of the casing. Being longer, this embodiment may be used as a securing pin as generally illustrated in e.g., FIGS. 16-17. In the present embodiment, the width of the casing tapers in the top to bottom direction of the casing whereby the bottom of the casing is slightly wider than the top. However, embodiments may also be provided in which the width of the casing remains essentially constant along its length.

More particularly, as can be seen in FIG. 34, this embodiment includes a connecting member in the form of a shaft 172 with cylindrical magnet 22 mounted on one end of the shaft. A further permanent (e.g. rare earth) magnet in the form of cylindrical magnet 174 is mounted on the opposite end of the shaft 172 for facilitating removal of the securing device as further described below. The cylindrical magnet 22 is again received by a permanent ring magnet 28 which is located within recess 176 of the main body 168 of the casing and retained against ledge 177 in a fixed position therein by a spacer in the form of a spacer ring 175 which in turn is seated on the bottom plug 166, whereby an air space 36 is formed between the floor of the bottom closure plug 166 and the bottom of the cylindrical magnet 22 when the cylindrical magnet 22 is in its initial position as shown in FIG. 34. As with the embodiment shown in FIGS. 32-33, the cylindrical magnet 22 in this embodiment is automatically slidably drawn through the fixed ring magnet 28 into the air space 36 from its initial position to its working position by attraction to the magnetically attracted material to which it magnetically couples to hold the securing device in its in use position when securing the first and second objects together such as e.g., an excavating tooth and an adapter of an excavation bucket, as described above. As will be understood, the shaft 172 and thereby the further cylindrical magnet 174 is also drawn along the casing with the movement of the cylindrical magnet 22 into its working position within the casing 12 as shown in FIG. 35.

An exploded view of the casing 12 of the embodiment illustrated in FIGS. 34-35 is illustrated in FIG. 36.

A further removal tool 178 for removing embodiments of securing devices 10 of for instance the type shown in FIGS. 32-36, is illustrated in FIGS. 37-39. The removal tool 178 comprises an essentially non-magnetic housing 80 open at a bottom end thereof. Rather than a single permanent magnet 84 as in the embodiment of the removal tool illustrated in FIG. 7, the embodiment shown in FIG. 36 and FIG. 37 comprises a permanent cylindrical coupling magnet 18 as well as a further permanent cylindrical magnet 182 received by an oppositely poled permanent ring magnet 184 that is held in a fixed position within the interior of the housing 80 as further discussed below. As with the cylindrical magnet 84 of the removal tool 78 illustrated in FIG. 7, the cylindrical magnet 180 is enclosed in a cup 186 formed from a magnetically attracted material (e.g., mild steel) except for the outwardly directed bottom face 188 of the magnet. Again, the circumferential perimeter of the magnet 180 is spaced from the cup as in conventionally known pot magnets, whilst the top face of the magnet 180 is in direct contact with the cup (as is the top face of the magnet 84 of the embodiment illustrated in FIG. 7) as is also known in conventional pot magnets. In the present embodiment, a thin layer of an epoxy is again utilised to fill a spacing of about 1 mm (indicated by the numeral 183) from the surrounding cup 186.

As can be further seen, the cylindrical magnets 180 and 182 of the removal tool 178 are secured to either side of the cup 186 by respective mechanical fasteners in the form of internal screws 192 and 194, and the ring magnet 184 is seated on an internal ledge 196 of the housing 80. A closure member in the form of plug 198 of the housing 80 retains the ring magnet 184 in position on the ledge 196 and in the embodiment shown, the plug 198 threadably mating with the main body of the housing.

Handle members 200a and 200b extend from the cup 186 and together form a release handle. As best shown in FIG. 39, the handle members 200a and 200b each extend through a corresponding slot 202a and 202b formed in the surrounding side wall of the main body of the housing 80. As each slot is orientated in the longitudinal direction of the housing, the cylindrical magnets 180 and 182 are able to move back and forth in the lengthwise direction of housing with travel of the release handle as also described further below. Further handle members 204a and 204b extend from the plug 198 of the housing and together form a pulling handle. In at least some embodiments, these handle members may be integrally formed with the threaded closure plug 198. When the cylindrical coupling magnet 180 is in its initial position as shown in FIG. 37, an air space 36 is provided in the housing 80 immediately below that magnet.

To remove a securing device 10 as for instance exemplified in FIGS. 32-36 from its in use position using the removal tool 178 such as from the passageway formed by aligned openings of a tooth and adaptor therefor of a mining or excavation bucket as described above, tool 178 is positioned bottom down on the top of casing 12 of the device.

The removal of the securing pin 10 comprises travel of the cylindrical magnet 180 of the removal tool 178 along the housing 80 to magnetically couple with the corresponding cylindrical magnet 22 or 174 against the magnetic repulsion provided by the ring magnet 184 to the travel of the further cylindrical magnet 182. The travel of the cylindrical coupling magnet 180 along the housing from its initial position is limited to the bottom end of the housing by the length of the slots 202a and 202b, and can be driven by the manual application of force to the pin release handle formed by handle members 200a and 200b or automatically by magnetic attraction of the cylindrical magnet 180 of the removal tool for the corresponding cylindrical magnet 22 or 174 of the securing device 10. In either case, the resistance to the travel of the cylindrical coupling magnet 180 provided by the ring magnet 184 acts to dampen the movement of the cylindrical magnet into a magnetic coupling relationship with the cylindrical magnet 22 or 174. Once this magnetic coupling is formed, the removal of the securing device 10 is then achieved by pulling rearwardly on the pulling handle of the removal tool formed by handle members 204a and 204b to dislodge the securing device from position. As will also be understood, the removal of the securing device 10 from its in use position is further facilitated by the attraction of the cylindrical magnet 22 or 174 of the securing device for the cylindrical magnet 180 of the removal tool.

When removed from its in use position the securing device 10 remains magnetically attached to the base of the removal tool 174. To physically remove the securing device from the removal tool, the release handle formed by handle members 200a and 200b is squeezed toward the pulling handle causing the cylindrical magnet 180 of the removal to be retracted into the housing 80. This movement is further facilitated by the magnetic repulsion between the ring magnet 184 and the further cylindrical magnet 182 acting to return that cylindrical magnet to its initial position with respect to the ring magnet 184. This ring magnet and cylindrical magnet arrangement thus functions in a corresponding manner to the ring magnet 28 and cylindrical magnet 22 arrangements of securing devices 10 as described herein. As described above, the casing 12 and plunger 20 of embodiments of a securing device 10 as described above are fabricated from a material that is essentially non-magnetic. Any suitable such material having the requisite strength, rigidity and robustness for the intended use of the device can be utilised. Most desirably, the casing and plunger are fabricated from an austenitic metal e.g., an austenitic steel or stainless steel. Similarly, the casing 80 of a removal tool e.g., 178 embodied by the invention may be formed from any suitable essentially non-magnetic or austenitic metal as described above. As will also be understood, a non-magnetic or essentially non-magnetically attracted material is one which has no or magnetic properties or is an essentially non-magnetically attracted material for the intended purpose and use of the material.

Preferred austenitic steels are those including some or all of the additives selected from the group consisting of manganese (Mn), molybdenum (Mo), chromium (Cr), nickel (Ni), carbon (C) and nitrogen (N). In particularly preferred austenitic steels, the magnetic relative permeability of the steel is less than about 1.001. Most desirably, the nickel content of the steel is less than about 2% w/w. Suitable austenitic steel castings are, for example, available from Keech Castings Australia Pty Ltd, Bendigo, Victoria, Australia. In other embodiments where the strength and robustness of the casing need not be as great, a non-magnetic material such as a suitable plastics material or an aluminium or aluminium alloy may be used.

In some embodiments of the invention employing a retaining plate 46 or 164 as described above, the retaining plate may also be fabricated from a suitable austenitic or essentially non-magnetically attracted material although in such embodiments, the retaining plate can incorporate a further magnet as described above to which the cylindrical magnet or the ring magnet magnetically couples in use of the securing device.

Any suitable permanent magnets may be utilised for the purposes of the moveable and other magnet(s) of a securing device embodied by the invention, including rare-earth magnets and rare-earth-free magnets. Rare earth magnets can be selected from samarium-cobalt magnets and neodymium (e.g., neodymium, iron and boron) magnets.

As will also be understood, securing devices as described herein find broad application and can be used for instance to secure digger, ripper and excavation teeth, cutting edges, wear plates and the like to excavation buckets, drag-line buckets, and rotating excavator buckets of diggers, excavators, mining and ground engaging machinery. However, applications of securing devices and methods as described herein are not limited thereto, and the present disclosure extends to the use of securing devices as describe herein in articulation hinges and hitches to earth moving and mining machinery, booms gates and boom points, sprockets and idlers, and rack and pinion systems, amongst a broad range of other uses.

From the above it will be apparent that embodiments of the invention may variously provide one or more of the following advantages.

A relatively quick an easy way of securing components together as described herein;

Securing together of the components without the need for tightening of a mechanical fastener (e.g., a bolt or screw) and thereby, avoiding risk of damage to the fastener and/or the fastener rusting or otherwise becoming stuck or cemented in position;

Ready removal of the securing device allowing for ease of separation of the secured components from one other;

Protection against external dust and debris accumulating about the securing device 10 by virtue of the cap moving to a closed position in use, blocking the entry of dust and debris into the assembly of the components secured by the device;

Minimisation of wear and thereby maintenance of the device by virtue of the use of a fixed and a moveable permanent magnet as described above;

Damping of the movement of the plunger 20 of a device 10 as the plunger is moved to its securing position by virtue of the magnetic polarities of the fixed and movable magnets, allowing for the use of damping means such as compression and/or tension springs which are prone to wear and loss of elasticity;

Use of the securing device 10 in a range of different applications; and

Reusability of the device.

As will also be understood, feature(s) and/or integer(s) of an embodiment as described above may be implemented in conjunction with feature(s) and/or integer(s) of other embodiments, e.g., aspects of one embodiment may be combined with aspects of another embodiment to realize yet further embodiments within the scope of the present disclosure, and all such arrangements and embodiments are expressly provided for herein.

Although a number of embodiments of the invention have been described above it will be understood that various modifications and changes may be made thereto without departing from the invention. The above described embodiments are therefore only illustrative and are not to be taken as being restrictive.

The invention claimed is:

1. A securing device for releasably securing a first object to a second object, the device comprising: a moveable magnet; a further magnet: and a casing having a top end and a bottom end the moveable magnet and the further magnet being housed in the casing and one of the moveable and the further magnets being received by the other of the magnets such that the one of the magnets is disposed in a through passageway of the other of the magnets, the further magnet and the moveable magnet being oppositely magnetically poled to one another in an initial position of the moveable magnet, and wherein the casing is configured for being inserted in a passageway formed by aligned openings of the first and second objects when assembled together in an assembly to extend from one of the first and second objects into the other of the first and second objects to seat the bottom end of the casing in position in the assembly for retaining the first object and the second object against separation from one another, and the moveable magnet is moveable in the top to bottom direction of the casing from the initial position to a working position in the casing to form a magnetic coupling for holding the bottom end of the casing in its seated position in the assembly and thereby the casing in position in the passageway, wherein the further magnet is arranged for being in a magnetically repelling relationship with the moveable magnet when the moveable magnet is in its working position to assist release of the moveable magnet from the magnetic coupling for return of the moveable magnet to its initial position and withdrawal of the securing device from the passageway; and wherein the first and second objects are selected from a group consisting of: a digger, mining or excavation tooth and an adaptor for the tooth; a digger tooth, cutting edge or wear plate and a mining or excavation bucket for the digger tooth, cutting edge or wear plate; and a material handling chute, bin, hopper or bucket and a wear plate for the material handling chute, bin hopper or bucket.

2. The securing device according to claim 1 being a unitary assembly in which the moveable magnet and the further magnet are retained captive within the casing and the moveable magnet is restricted to movement between the initial and working positions of the moveable magnet.

3. The securing device according to claim 1, wherein the moveable magnet is disposed in the casing for automatically moving by magnetic attraction to its working position from its initial position to form the magnetic coupling when the casing is located in the passageway formed by the aligned openings of the first and second objects.

4. The securing device according to claim 1, wherein the casing is fabricated from an essentially non-magnetically attracted material.

5. The securing device according to claim 1, wherein the one of the magnets is a cylindrical magnet and the other of the magnets is a ring magnet.

6. The securing device according to claim 1, wherein the securing device further comprises a plunger to which the movable magnet is secured, whereby the plunger is moved from a resting position to a securing position with the movement of the moveable magnet from its initial position to its working position.

7. The securing device according to claim 6, further comprising a cap on an outer end of the plunger, the cap being formed from a magnetically attracted material and arranged to move with the plunger to close the casing with the movement of the plunger to its securing position.

8. The securing device according to claim 1, wherein the casing has a closed said top end covering the movable magnet and the moveable magnet is disposed in the casing for automatically moving by magnetic attraction to its working position from its initial position to form the magnetic coupling when the casing is located in the passageway formed by the aligned openings of the first and second objects.

9. The securing device according to claim 8, further comprising:
   an additional magnet disposed within the casing; and
   a connector wherein the moveable magnet is mounted to one end of the connector and the additional magnet is mounted to an opposite end of the connector, the additional magnet and the connector being movable along within the casing with the movement of the movable magnet, and wherein the additional magnet is arranged in an upper end region of the casing for magnetic attraction to a magnet of a removal tool for withdrawal of the movable magnet when the removal tool is placed on the top end of the casing.

10. The securing device according to claim 1, wherein the further magnet is retained in a fixed position within the casing of the securing device.

11. The securing device according to claim 10, wherein the moveable magnet is moved into the magnetically repelling relationship with the further magnet with travel of the moveable magnet from its initial position to its working position.

12. The securing device according to claim 11, wherein the magnetically repelling relationship dampens movement of the movable magnet into its working position and facilitates return of the movable magnet to its initial position in the casing upon the movable magnet being withdrawn from the magnetic coupling.

13. An assembly of a first object and a second object, the assembly comprising: a securing device, the securing device comprising a casing having a top end and a bottom end; a moveable magnet and a further magnet, the moveable magnet and the further magnet being housed in the casing in which the further magnet is retained in a fixed position, one of the moveable and the further magnets being received by the other of the magnets such that the one of the magnets is disposed in a through passageway of the other of the magnets, and the further magnet and the moveable magnet being oppositely magnetically poled to one another in an initial position of the movable magnet, the movable magnet being slidable relative to the further magnet in a top to bottom direction of the casing between the initial position and a working position in which the moveable magnet is in a magnetically repelling relationship with the further magnet; and wherein the first object and the second object are assembled together in the assembly whereby aligned openings of the first and second objects form a passageway in which the casing of the securing device is inserted to extend from one of the first and second objects into the other of the first and second objects such that the bottom end of the casing is seated in position in the assembly for retaining the first object and the second object against separation from one another, the moveable magnet being in its working position forming a magnetic coupling holding the bottom end of the casing in its seated position in the assembly and thereby the casing in the passageway, wherein the magnetically repelling relationship between the moveable magnet and the further magnet assists release of the movable magnet from the magnetic coupling for return of the moveable magnet to its initial position and withdrawal of the securing device from the passageway; and wherein the first and the second objects are selected from the group consisting of: a digger, mining or excavation tooth and an adaptor for the tooth; a digger tooth, cutting edge or wear plate and a mining or excavation bucket for the digger tooth, cutting edge or wear plate; and a material handling chute, bin, hopper or bucket and a wear plate for the material handling chute, bin, hopper or bucket.

14. The assembly according to claim 13, wherein the one of the magnets is a cylindrical magnet and the other of the magnets is a ring magnet.

15. A method for releasably securing a first object to a second object, comprising: providing a securing device for securing the first object and the second object together, the securing device comprising a casing having a top end and a bottom end, a moveable magnet and a further magnet, the moveable magnet and the further magnet being housed in the casing in which the further magnet is retained in a fixed position, one of the moveable and the further magnets being received by the other of the magnets such that the one of the magnets is disposed in a through passageway of the other of the magnets, and the further magnet and the moveable magnet being oppositely magnetically poled to one another in an initial position of the movable magnet, the movable magnet being slidable relative to the further magnet in a top to bottom direction of the casing between the initial position and a working position in which the moveable magnet is in a magnetically repelling relationship with the further magnet; assembling the first and second objects together in an assembly whereby openings of the first and the second objects are aligned forming a passageway; and positioning the casing of the securing device in the passageway such that the casing extends from one of the first and second objects into the other of the first and second objects such that the bottom end of the casing is seated in position in the assembly to retain the first object and the second object against separation from one another, and the moveable magnet is moved from its initial position to its working position to form a magnetic coupling holding the bottom end of the casing in its seated position in the assembly and thereby the casing in the passageway, wherein the magnetically repelling relationship between the moveable magnet and the further magnet assists release of the moveable magnet from the magnetic coupling for return of the moveable magnet to its initial position and removal of the securing device from the passageway; and wherein the first and the second objects are selected from the group consisting of: a digger, mining or excavation tooth and an adaptor for the tooth; a digger tooth, cutting edge or wear plate and a mining or excavation bucket for the digger tooth, cutting edge or wear plate; and a material handling chute, bin, hopper or bucket and a wear plate for the material handling chute, bin, hopper or bucket.

16. The method according to claim 15, wherein the one of the magnets is a cylindrical magnet and the other of the magnets is a ring magnet.

* * * * *